(12) United States Patent
Wilson et al.

(10) Patent No.: US 11,817,687 B2
(45) Date of Patent: Nov. 14, 2023

(54) CABLE TRAY CLIPS AND METHODS FOR USING THE SAME

(71) Applicant: ERICO International Corporation, Solon, OH (US)

(72) Inventors: Eric J. Wilson, Solon, OH (US); Jeff Wilson, Cuyahoga Falls, OH (US); Scott Laughlin, Middlefield, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 17/724,865

(22) Filed: Apr. 20, 2022

(65) Prior Publication Data

US 2022/0337043 A1 Oct. 20, 2022

Related U.S. Application Data

(60) Provisional application No. 63/177,081, filed on Apr. 20, 2021.

(51) Int. Cl.
| | |
|---|---|
| *F16L 3/00* | (2006.01) |
| *H02G 3/06* | (2006.01) |
| *F16B 5/06* | (2006.01) |
| *F16L 3/26* | (2006.01) |
| *H02G 3/04* | (2006.01) |

(52) U.S. Cl.
CPC ......... *H02G 3/0608* (2013.01); *F16B 5/0621* (2013.01); *F16L 3/26* (2013.01); *H02G 3/0443* (2013.01); *F16B 2005/0678* (2013.01)

(58) Field of Classification Search
CPC .... H02G 3/0608; H02G 3/0443; H02G 3/263; H02G 3/34; F16B 5/0621; F16B 2005/0678; F16L 3/26
See application file for complete search history.

(56) References Cited

U.S. PATENT DOCUMENTS

| | | | | |
|---|---|---|---|---|
| 3,098,273 A | * | 7/1963 | Cochran | ............ F16L 3/04 248/71 |
| 3,188,138 A | * | 6/1965 | Lockshin | ............ A47C 1/124 24/339 |
| 4,417,711 A | * | 11/1983 | Madej | ............ F16L 3/1041 411/379 |
| 5,384,937 A | | 1/1995 | Simon | |
| 6,193,434 B1 | | 2/2001 | Durin et al. | |
| 6,247,871 B1 | | 6/2001 | Nickel et al. | |
| 6,402,418 B1 | | 6/2002 | Durin et al. | |
| 6,497,395 B1 | * | 12/2002 | Croker | ............ H02G 3/30 248/220.21 |
| 6,590,154 B1 | | 7/2003 | Badey et al. | |

(Continued)

FOREIGN PATENT DOCUMENTS

| | | |
|---|---|---|
| AT | 329133 B | 4/1976 |
| AU | 2010202135 A1 | 1/2011 |

(Continued)

*Primary Examiner* — Amy J. Sterling
(74) *Attorney, Agent, or Firm* — QUARLES & BRADY LLP

(57) ABSTRACT

A cable tray clip can couple sections of a wire mesh cable tray. The cable tray clip can include a base and a retainer rotatably coupled to the base. The retainer can be rotated to a closed position to retain one or more wires within one or more pockets on the base.

18 Claims, 27 Drawing Sheets

(56) References Cited

U.S. PATENT DOCUMENTS

| | | | |
|---|---|---|---|
| 7,387,282 B2 * | 6/2008 | Kovac | F16L 3/237 248/65 |
| 7,468,491 B2 * | 12/2008 | Deciry | H02G 3/0608 174/480 |
| 7,608,786 B2 | 10/2009 | Deciry et al. | |
| 7,708,491 B2 | 5/2010 | Quertelet et al. | |
| 7,859,378 B2 * | 12/2010 | Merck | H01F 38/14 336/174 |
| 7,993,169 B1 * | 8/2011 | Hoxha | H01R 4/5091 439/783 |
| 8,177,172 B2 | 5/2012 | Quertelet et al. | |
| 8,424,814 B2 | 4/2013 | Davis et al. | |
| 8,684,319 B2 | 4/2014 | Brouwer et al. | |
| 8,708,290 B2 * | 4/2014 | Franta | B65H 57/06 248/219.3 |
| 8,757,559 B2 | 6/2014 | Davis et al. | |
| 9,178,343 B2 | 11/2015 | Brouwer et al. | |
| 9,826,832 B2 * | 11/2017 | Lin | F16B 2/065 |
| 9,853,428 B2 | 12/2017 | Brouwer et al. | |
| 10,021,986 B1 * | 7/2018 | Lin | A47C 1/124 |
| 10,337,651 B1 * | 7/2019 | Kuo | H02G 3/32 |
| 10,655,374 B2 * | 5/2020 | Fukumoto | F16L 3/237 |
| 11,056,865 B2 | 7/2021 | Brouwer et al. | |
| 11,121,631 B2 | 9/2021 | Cretella | |
| 11,128,113 B2 | 9/2021 | Martinez Ramos et al. | |
| 2001/0044992 A1 * | 11/2001 | Jahrling | A47B 88/43 24/563 |
| 2003/0108385 A1 | 6/2003 | Finco et al. | |
| 2003/0116682 A1 | 6/2003 | Finco et al. | |
| 2005/0063775 A1 | 3/2005 | Boltz | |
| 2014/0374544 A1 * | 12/2014 | Pearson | F16L 3/223 248/68.1 |
| 2015/0335169 A1 * | 11/2015 | Lin | A47C 7/58 24/517 |
| 2017/0030487 A1 * | 2/2017 | Sampson | F16L 55/035 |
| 2020/0244055 A1 | 7/2020 | Cretella | |
| 2021/0184441 A1 | 6/2021 | Martinez Ramos et al. | |
| 2022/0131352 A1 | 4/2022 | Sledzinski et al. | |

FOREIGN PATENT DOCUMENTS

| | | |
|---|---|---|
| CN | 201851787 U | 6/2011 |
| CN | 111525475 A | 8/2020 |
| DE | 29825088 U1 | 8/2004 |
| DE | 102005018414 A1 | 11/2006 |
| EP | 1206021 A2 | 5/2002 |
| EP | 1727252 A1 | 11/2006 |
| EP | 1793464 A1 | 6/2007 |
| EP | 2346129 B1 | 7/2013 |
| EP | 2768098 B1 | 9/2015 |
| EP | 2884608 B1 | 11/2015 |
| EP | 2830174 B1 | 5/2018 |
| EP | 2176931 B1 | 10/2019 |
| EP | 3644465 A1 | 4/2020 |
| FR | 2208219 A1 | 6/1974 |
| FR | 2698416 B1 | 1/1995 |
| FR | 2879036 B1 | 2/2007 |
| FR | 2937399 B1 | 11/2010 |
| FR | 2953655 B1 | 6/2012 |
| FR | 2937400 B1 | 5/2013 |
| FR | 3040830 B1 | 9/2018 |
| GB | 2458750 B | 3/2012 |
| GB | 2467426 B | 4/2013 |
| GB | 2472889 B | 5/2013 |
| GB | 2482607 B | 5/2015 |
| GB | 2543510 B | 1/2020 |
| WO | 2005/090845 A1 | 9/2005 |
| WO | 2012/104545 A1 | 8/2012 |
| WO | 2012/168644 A1 | 12/2012 |
| WO | 2012/168655 A1 | 12/2012 |
| WO | 2013/007936 A2 | 1/2013 |
| WO | 2014/006246 A1 | 1/2014 |
| WO | 2015/140376 A1 | 9/2015 |

\* cited by examiner

CABLE TRAY CLIPS AND METHODS FOR USING THE SAME

CROSS-REFERENCE TO RELATED APPLICATIONS

This application claims priority under 35 U.S.C. 119 from U.S. Provisional Application No. 63/177,081, filed Apr. 20, 2021, titled "Splice Clip for Cable Trays," and is incorporated herein by reference in its entirety.

BACKGROUND

Cable trays are used within the electrical installation industry to provide a continuous pathway and support for electrical and/or data/low voltage cabling within a building. Cable trays can have a shape of an open trough, for example, to allow access to lay cables therein, pulled there along, or supported therefrom. Cable trays can be wire-frame trays and can be manufactured or field-cut in discreet sections, which must be joined together.

Cable tray, specifically basket tray, is manufactured in discreet sections; typically 3 meters (10 feet) in length. When installed, the sections may need to be connected (spliced) mechanically to secure the sections to one another, and electrically to bond the sections for a ground path (equipment ground conductor).

SUMMARY

In many applications, it may be useful to mechanically and electrically secure discrete sections of a cable try without the use of tools. Traditional methods for joining sections of a cable tray rely on nuts, bolts, and washers. These methods add time and complication through multiple parts to the job of joining sections of a cable tray. Additionally, if the parts loosen over time, the electrical connection between the tray sections may be lost. Accordingly, there is a need for a splice clip that can join two discrete sections of a cable tray capable of providing a secure mechanical connection and electrical bonding easily and reliably, without the use of multiple parts and requiring tools for installation.

Some embodiments of the invention can provide a cable tray clip for attachment to a wire mesh cable tray with a first wire and a second wire. The cable tray clip can include a base with a set of pockets. The set of pockets can include a first pocket sized to receive the first wire and a second pocket sized to receive the second wire. A retainer can be rotatably coupled to the base. The retainer can be rotatable between an open configuration and a closed configuration. With the retainer in the open configuration, the first pocket can be open to receive the first wire of the wire mesh cable tray into the first pocket and the second pocket can be open to receive the second wire of the wire mesh cable tray into the second pocket. With the retainer in the closed configuration, the retainer can close at least one of the first or second pockets to retain, respectively, at least one of the first or second wires between the retainer and the base.

Some embodiments of the invention can provide a cable tray clip for attachment to a wire mesh cable tray. The cable tray clip can include a base with a first base section with a first partition extending therefrom and a second base section with a second partition extending therefrom. A retainer can be rotatably coupled to the base. The base and the retainer can be arranged such that, with the cable tray clip installed on the wire mesh cable tray, the first and second base sections are located internal to the wire mesh cable tray, the first and second partitions extend from the first and second base sections through the wire mesh cable tray to be external to the wire mesh cable tray, and the retainer is engaged with the first and second partitions external to the wire mesh cable tray to retain the wire mesh cable tray between the first and second base sections and the retainer.

Some embodiments of the invention can provide a method for attaching a cable tray clip to a first wire and a second wire of a wire mesh cable tray. The method can include, with the cable tray clip in an open configuration, moving the cable tray clip to receive the first wire within a first pocket of a base of the cable tray clip and the second wire within a second pocket of the base. The method can further include rotating a retainer rotatably coupled to the base to place the cable tray clip in a closed configuration in which the first and second wires are retained within the first and second pockets and between the retainer and the base.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
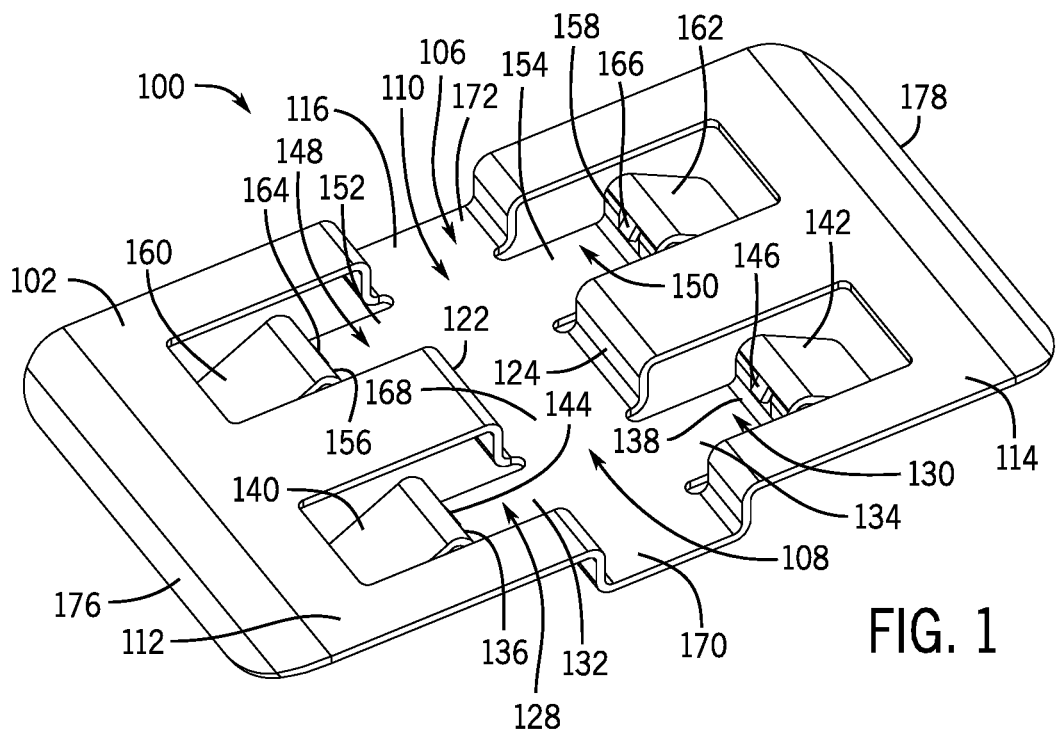
FIG. 1 is a top front isometric view of a cable tray clip according to an embodiment of the invention.
Figure 2:
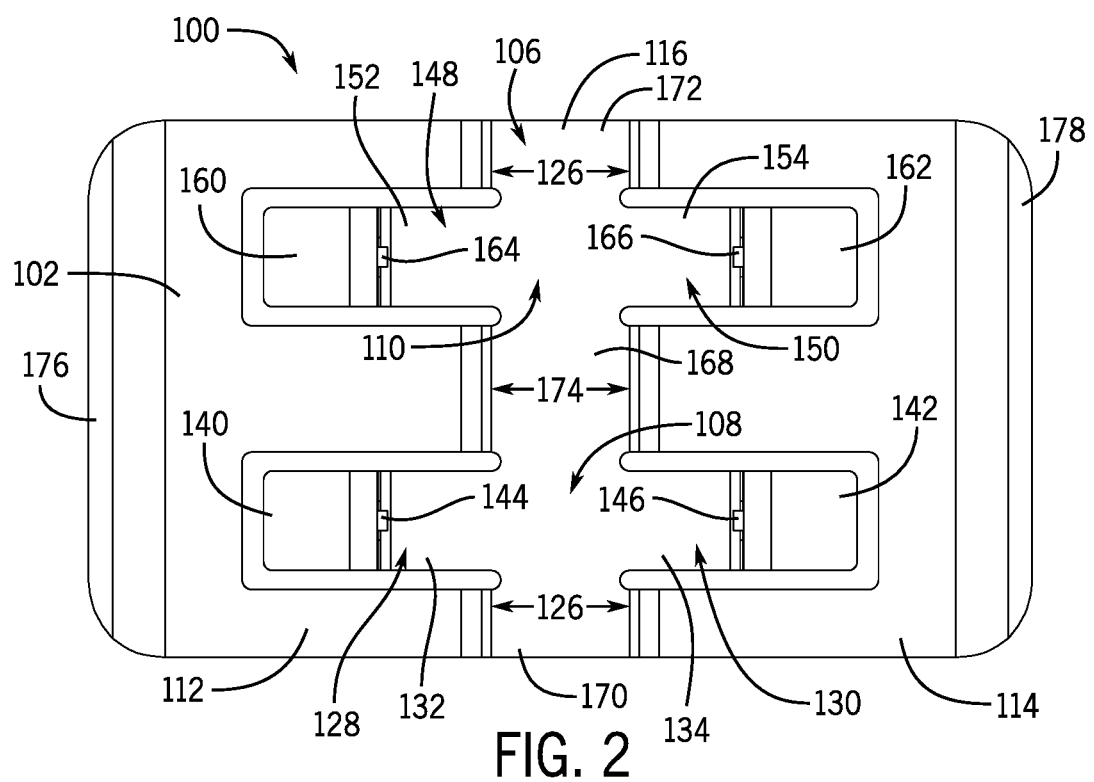
FIG. 2 is a top plan view of the cable tray clip of FIG. 1.
Figure 3:
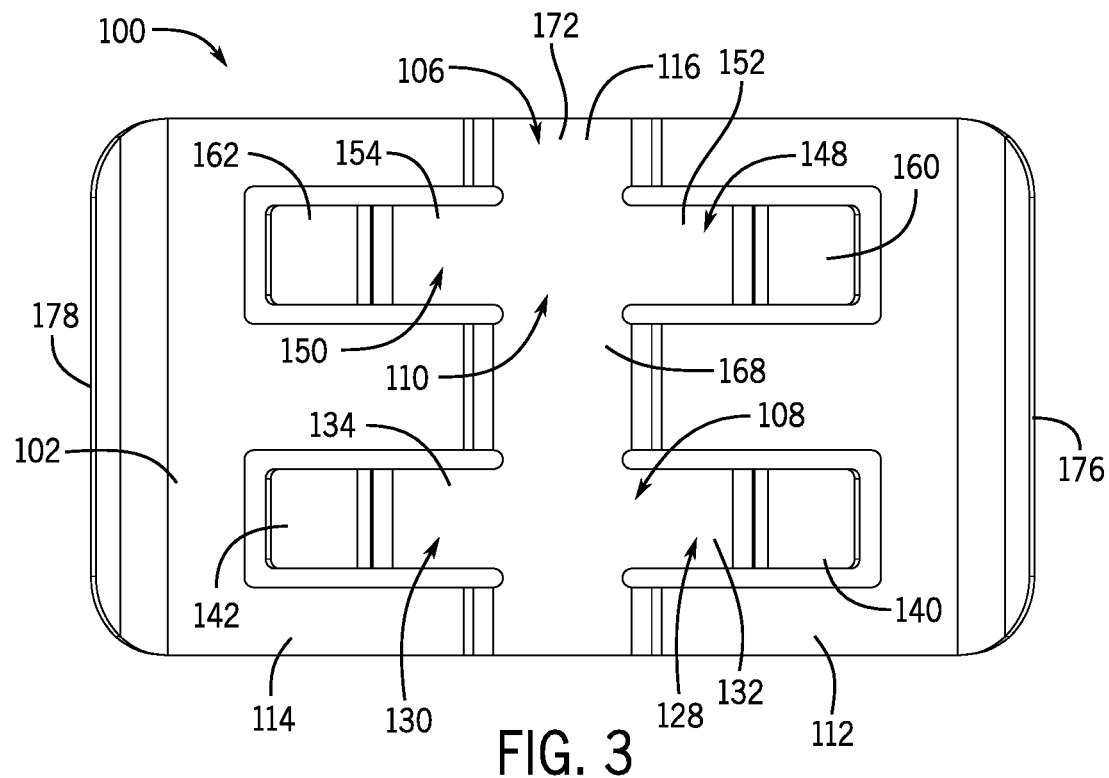
FIG. 3 is a bottom plan view of the cable tray clip of FIG. 1.
Figure 4:
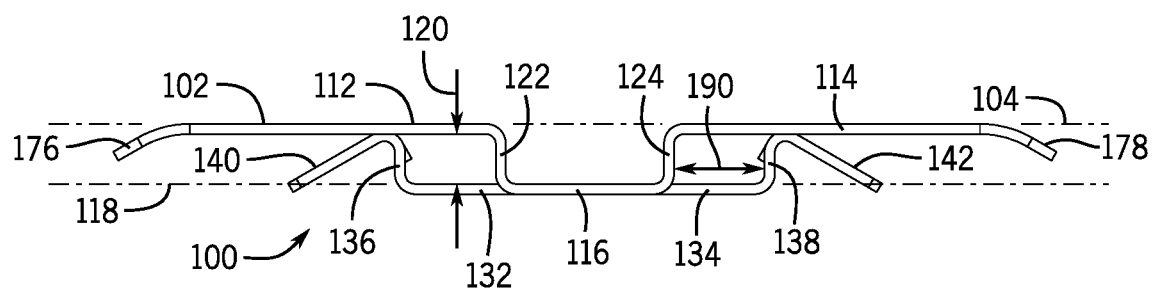
FIG. 4 is a front elevation view of the cable tray clip of FIG. 1.
Figure 5:
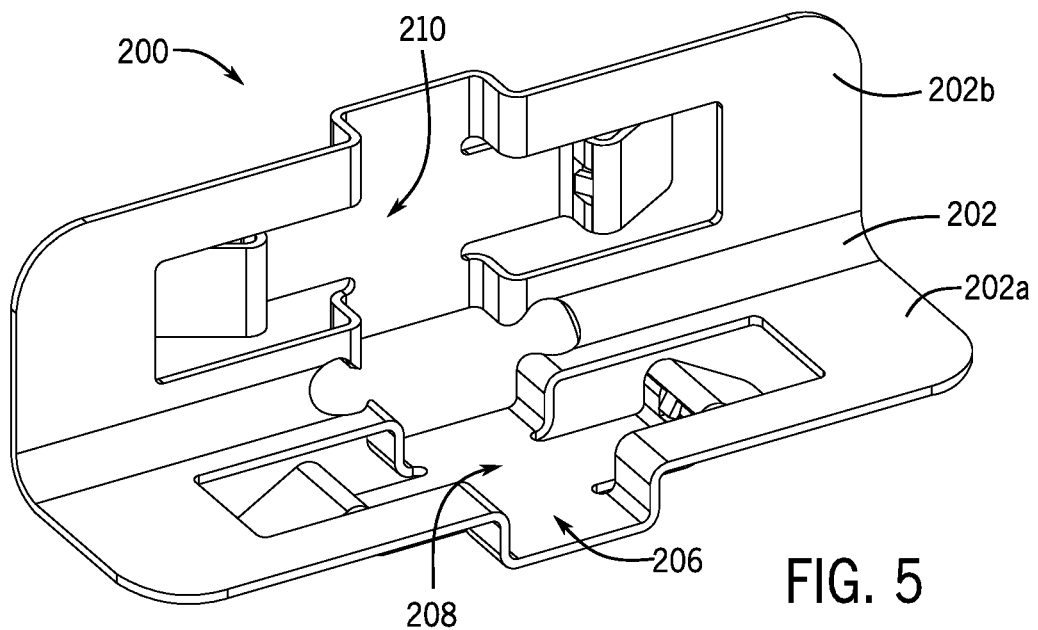
FIG. 5 is a top front isometric view of a cable tray clip according to another embodiment of the invention.
Figure 6:
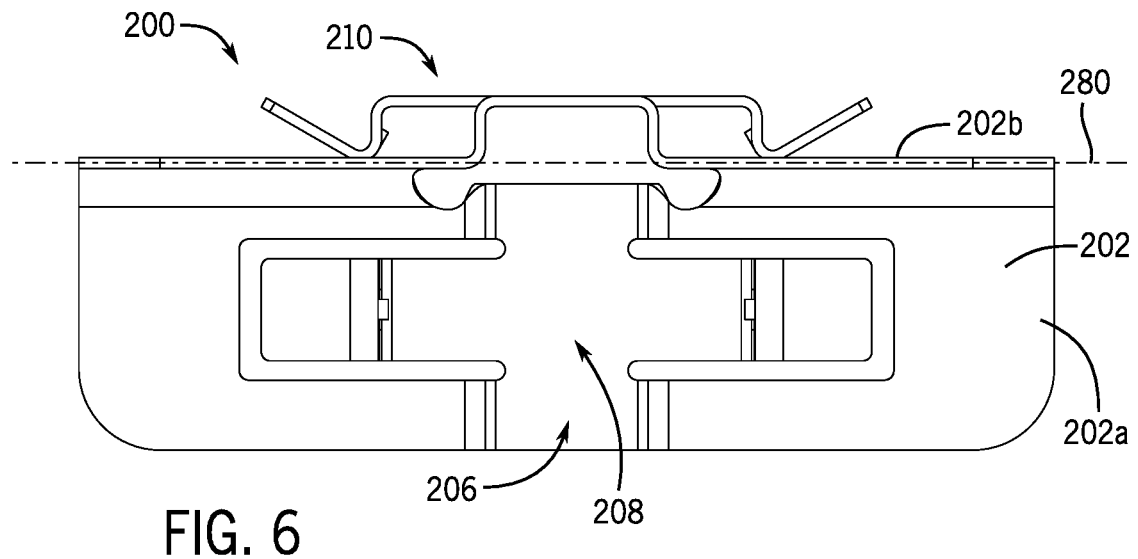
FIG. 6 top plan view of the cable tray clip of FIG. 5.
Figure 7:
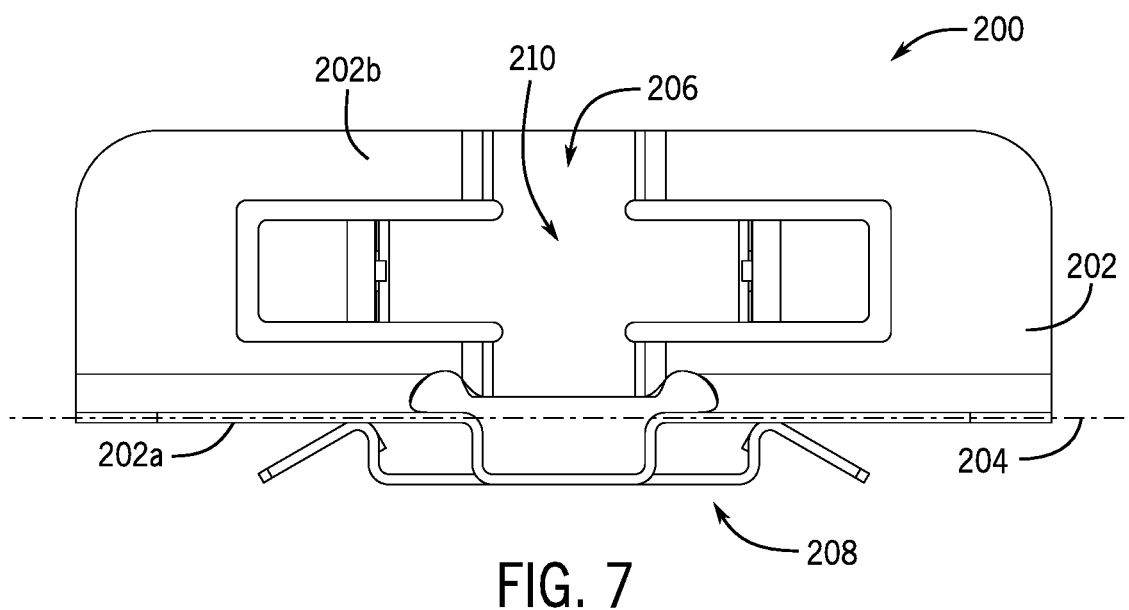
FIG. 7 is a front elevation view of the cable tray clip of FIG. 5.
Figure 8:
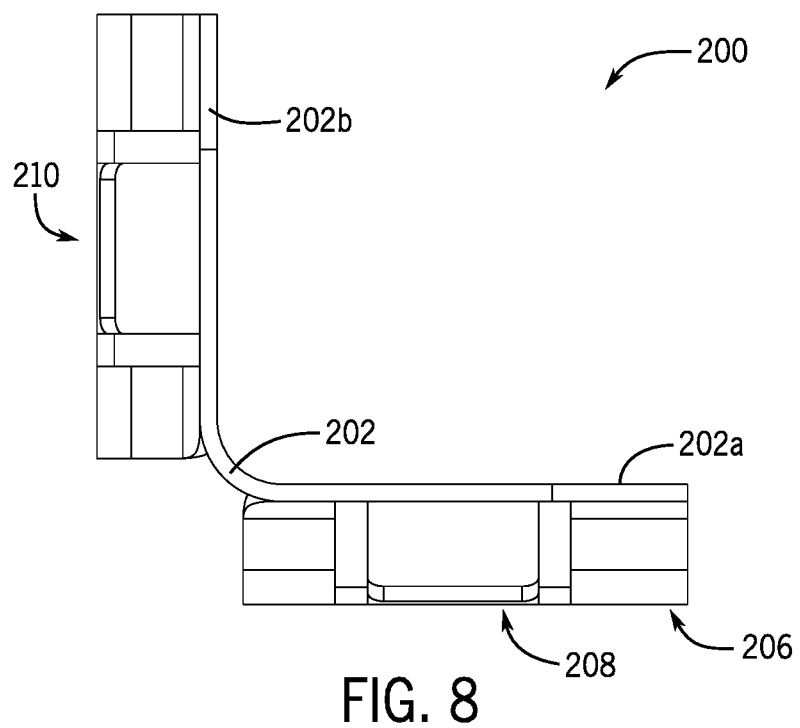
FIG. 8 is a right side elevation view of the cable tray clip of FIG. 5.
Figure 9:
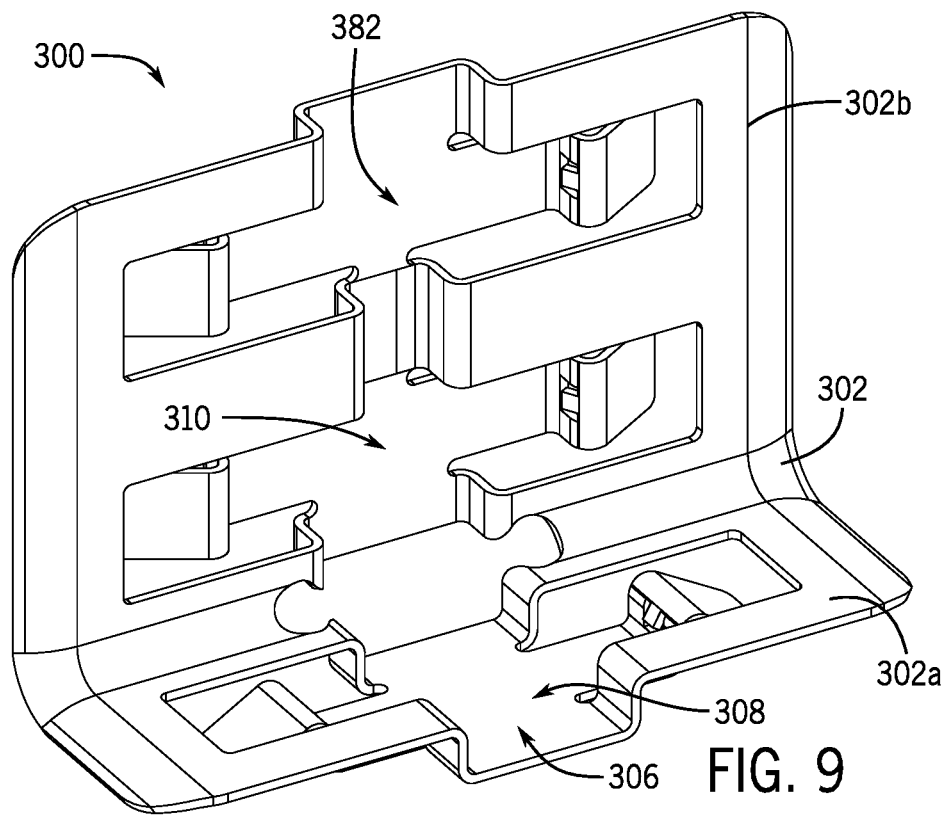
FIG. 9 is a top front isometric view of a cable tray clip according to another embodiment of the invention.
Figure 10:
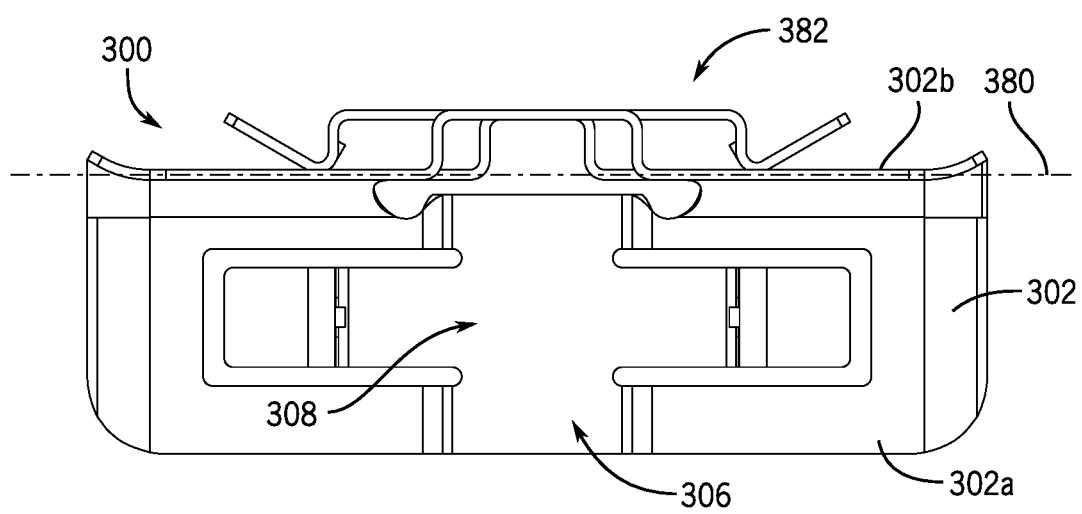
FIG. 10 is a top plan view of the cable tray clip of FIG. 9.
Figure 11:
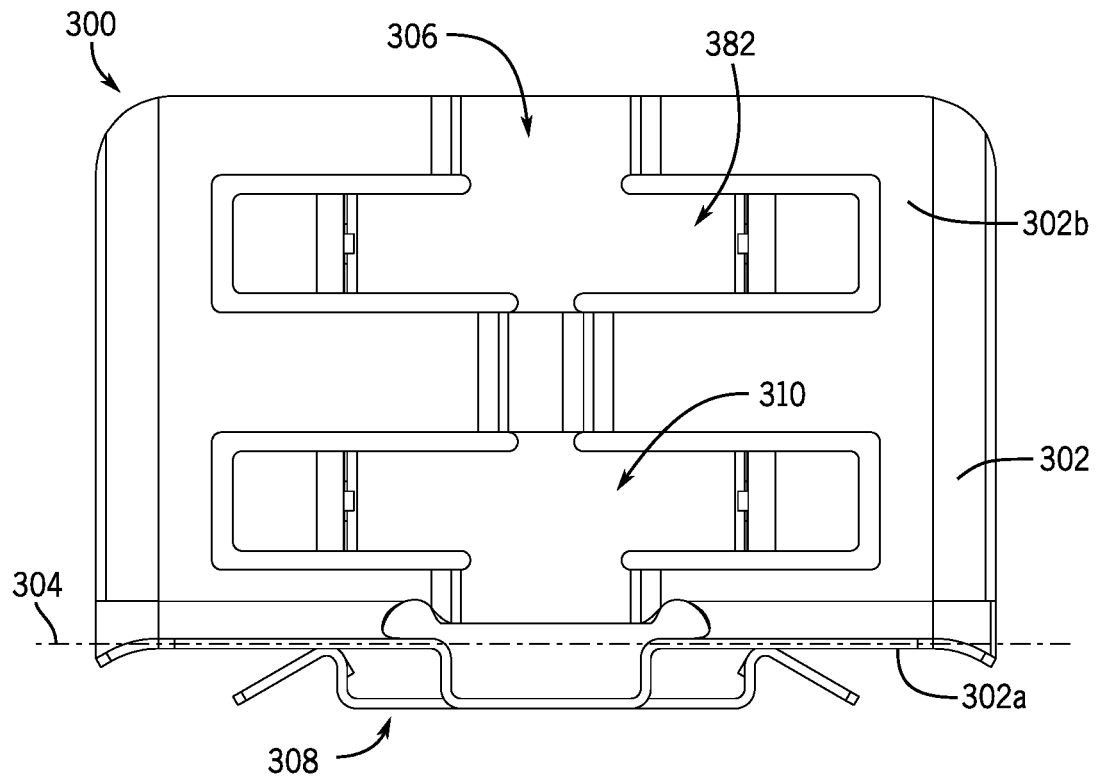
FIG. 11 is a front elevation view of the cable tray clip of FIG. 9.
Figure 12:
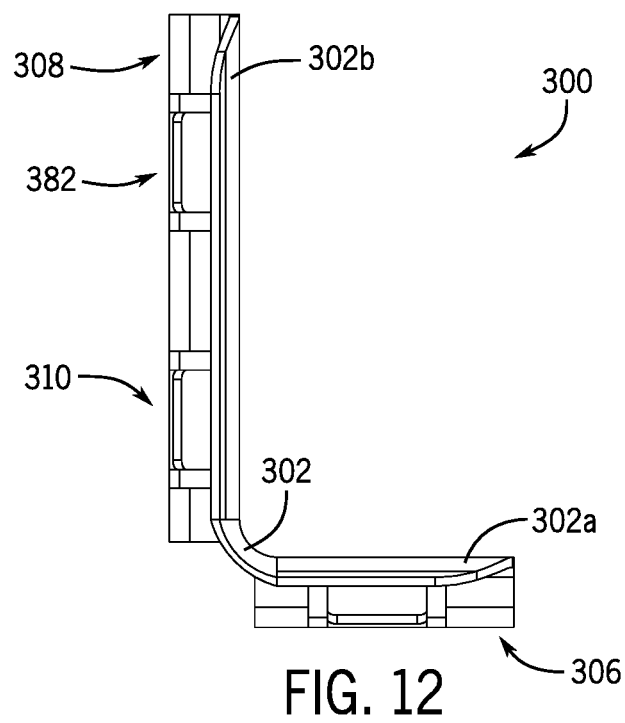
FIG. 12 is a right side elevation view of the cable tray clip of FIG. 9.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein in the context of geometric descriptions, unless otherwise limited or defined, "substantially" indicates correspondence to a particular shape or dimension within conventional manufacturing tolerances for components of a similar type or that are formed using similar processes. In this regard, for example, "substantially similar in configuration" can indicate a part that deviates from another part having the same elements within acceptable manufacturing tolerances.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms "about" and "approximately," as used herein with respect to a reference value, refer to variations from the reference value of ±15% or less, inclusive of the endpoints of the range. Similarly, the term "substantially equal" (and the like) as used herein with respect to a reference value refers to variations from the reference value of less than ±30%, inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

A cable tray clip configured to be installed to mechanically join and electrically bond discrete sections of a wire mesh cable tray system easily and reliably is described herein. Some embodiments of the cable tray clip can be used to quickly join sections of wire mesh cable tray through a tool-free, push-on, latching installation. Wire basket cable trays generally comprise a series of longitudinal and lateral wires that form a 2 inch by 4 inch grid along the bottom of tray. Wire basket trays 4 inch and deeper also typically have the same 2 inch by 4 inch grid found on the sides of the tray. Some embodiments according to the invention can provide a quick and easy connection between bottoms of the cable tray sections installation, the sides of the cable tray sections, or the bottoms and sides of the cable tray sections. A cable tray clip according to an embodiment of the invention can be installed by linearly sliding the clip relative to a first cable tray section (or, inherently, vice versa) so that a first tab of the cable tray clip engages a lateral wire of the first cable tray section. Then the clip can be slid relative to a second cable tray section (or, inherently, vice versa) so that a second tab of the cable tray clip engages a lateral wire of the second cable tray section. Multiple cable tray clips can be placed along the bottom and/or sides of the wire basket cable tray to secure the joined cable tray sections.

Some embodiments of the cable tray clip can be configured to space the cable tray sections apart a predetermined distance. This can be helpful when longitudinal wires of the cable tray sections extend beyond the lateral wires to be received in the cable tray clip. The space can provide an area for the longitudinal wire excess to be located without causing interference with the securing of the cable tray clip to the cable tray sections. Further, during installation, a pre-assembled cable tray can experience bending moments about the spliced ends. Some embodiments of the cable tray clip can add additional rigidity to the corner joint during the construction and installation of the cable tray. For example, embodiments of the cable tray clip can engage and secure corners (e.g., at the intersection of the bottom and side) of the cable tray sections. A cable tray clip connected in two perpendicular planes and can limit bending of the cable tray at the splice location when the assembled cable tray is lifted into position for installation.

In metallic cable tray installations for supporting electric cables, the cable tray sections need to be electrically bonded to form an equipotential grid in which no one section has a different electrical potential than any of the other sections. Not doing so can lead to undesired electricity flowing through sections of the cable tray, causing potentially hazardous conditions for the unintentional discharge of electricity. Therefore, some embodiments of the cable tray clip can provide electrical bonding between the cable tray sections.

Some embodiments of the cable tray clip can provide a twist-to-secure configuration. For example, a cable tray clip can have a set of tabs that can be inserted between adjacent lateral wires of two discrete cable tray sections. The tabs (or part or all of the clip, generally) can then be rotated relative to the lateral wires to engage the tabs therewith and thereby secure the cable tray sections together.

Some embodiments of the cable tray clip can provide an auxiliary support attachment to a cable tray section from which other support devices can be coupled. For example, a cable tray clip can be secured to a side or bottom of a cable tray section and can have an attachment nipple (e.g., a threaded post) extending therefrom onto which a support device (e.g., a conduit hanger) can be secured.

Some of the discussion below describes a cable tray clip that can be used to secure together sections of a cable tray. The context and particulars of this discussion are presented as examples only. For example, embodiments of the disclosed invention can be configured in various ways, including with other shapes and arrangements of elements. Similarly, embodiments of the invention can be used with arrangements of cable support structures, electrical brackets, or other assemblies other than those expressly illustrated or described herein.

FIGS. 1 through 4 illustrate a cable tray clip 100 according to an embodiment of the invention. The cable tray clip 100 includes a base 102 defining a base plane 104, a bridge 106, and at least one set of tabs (shown here with a first set of tabs 108 and a second set of tabs 110, however cable tray clips with only one set of tabs is contemplated) extending from the bridge 106. The base 102, the bridge 106, and the first and second set of tabs 108, 110 can be integrally formed as part of a single component and can be formed from an electrically conductive and appropriately resilient material (e.g., spring steel).

Continuing with the embodiment shown in FIGS. 1-4, the bridge 106 extends from and divides the base 102 into a first base section 112 and a second base section 114. The bridge 106 has a U-shape profile with a deck 116 spaced from and parallel with the base plane 104. Further, a set of side walls 122, 124 extend from and between the deck 116 and the base 102. The set of side walls 122, 124 define a bridge width 126 (see FIG. 4). It is contemplated that the bridge width 126 can be sized to allow the passage of a bolt if an additional form of connection is desired.

The first set of tabs 108 can include a first tab 128 and a second tab 130. The first and second tabs 128, 130 each have an engagement section 132, 134 extending from the deck 116 and spaced from and parallel with the base plane 104. The engagement sections 132, 134 are spaced a first distance 120 from the base 102 and define an engagement plane 118, which in the illustrated example is coextensive with a plane defined by the bridge 106, generally. The first distance 120 can be configured to be approximately equal to a thickness (e.g., diameter, if a circular cross-section) of a lateral wire 12 of a cable tray 10 (shown in FIG. 13).

Continuing, a spine section 136, 138 extends from the engagement section 132, 134 and toward the base plane 104. The spine section 136, 138 is spaced from the side wall 122 a second distance 190, which can be configured to be approximately equal to a width (e.g., diameter) of the lateral wire 12. A lead-in section 140, 142 extends from the spine section 136, 138 and away from the base plane 104. The spine sections 136, 138 also has a catch 144, 146 for engaging a lateral wire 12 (shown in FIG. 13) that is received by the first and second tabs 128, 130. The catch 144, 146 can generally increase the pressure of the first and second tabs 128, 130 on the lateral wire 12, and, for example, can be a protrusion, either integrally formed or added, extending outward from the spine section 136, 138. In some cases, a catch can also allow for secure engagement despite some variation in wire size.

The second set of tabs 110 are spaced from the first set of tabs 108 along the deck 116. The second set of tabs 110 is substantially similar in configuration to the first set of tabs 108 and include a first tab 148 and a second tab 150. Each of the first and second tabs 148, 150 has an engagement section 152, 154, a spine section 156, 158 with a catch 164, 166, and a lead-in section 160, 162.

The shape and configuration of the first and second tabs 128, 130 lends itself to slidably engaging and retaining the lateral wires 12, 26 of a first discrete section 20 and a second discrete section 22 of the cable tray 10. For example, as also noted above, the lead-in sections 140, 160 of the first tabs 128, 148 are angled away from the base plane 104. Accordingly, the lead-in sections 140, 160 contact the lateral wire 12 when an operator slides the cable tray clip 100 relative to the lateral wire 12 (or vice versa), which can cause the first tabs 128, 148 to bend away from the base plane 104 and allow the cable tray clip 100 to continue to slidingly move relative to the lateral wire 12 (e.g., without required rotation of the clip 100 or the tray 10). With continued lateral movement of the cable tray clip 100 relative to the lateral wire 12, the lateral wire 12 moves past the lead-in sections 140, 160 and is received between the spine section 136, 138, the engagement section 132, 134, the base 102, and the side wall 122 of the bridge 106. The second discrete section 22 with the lateral wire 26 can then (or simultaneously) be similarly joined to the cable tray clip 100 within the second tabs 130, 150, effectively mechanically joining and electrically bonding the first discrete section 20 with the second discrete section 22.

Further in this regard, the side wall 122 of the bridge 106 acts as a stop to allow the lateral wire 12 to extend only so far into the cable tray clip 100 and thereby can help to ensure appropriate alignment and secure engagement of the tray 10. Further, a similar structural interaction, as well as the U-shape of the bridge 106, generally, can allow the bridge 106 to absorb any compressive loading experienced on the side walls 122, 124 between the first and second discrete sections 20, 22 and across the cable tray clip 100.

In some embodiments, the bridge 106 can have a different width between the first and second sets of tabs 108, 110 than at other locations relative to the first and second sets of tabs 108, 110. For example, the bridge 106 includes a bridge middle section 168 between the first and second sets of tabs 108, 110 and bridge outer sections 170, 172 located with lateral offsets relative to the first and second sets of tabs 108, 110. As shown, the bridge middle section 168 can have a bridge middle section width 174 (see FIG. 2) that is smaller than the bridge width 126 of the bridge outer sections 170, 172. The narrower bridge middle section 168 can allow extra room for a longitudinal wire 24 of a discrete cable tray section 20, 22 that extends beyond the received lateral wire 12. This can reduce the likelihood of interference when joining the cable tray clip 100 to the cable tray sections 20, 22 and can correspondingly also help to ensure the lateral wires 12 are fully received by the first and second sets of tabs 108, 110.

In some embodiments, the invention can provide a cable tray clip that exhibits a relatively low profile within a cable tray, so as not to provide a snag point on which cables (not shown) can be caught while installing the cables or to act as a pressure point for cables over extended periods. For example, these benefits can be provided by the concave configuration of the bridge 106, relative to cables in a tray that is secured with the cable tray clip 100. Also, some cable tray clips (e.g., the clip 100) can be designed to join discrete sections of a cable tray without requiring the sections to overlap each other. This can help maintain an even transition between discrete sections of a tray and a consistent cable tray surface along which the cables can be placed. This too can reduce the likelihood of uneven pressure being applied to the first layer of cables at the joint between cable tray sections.

Figure 13:
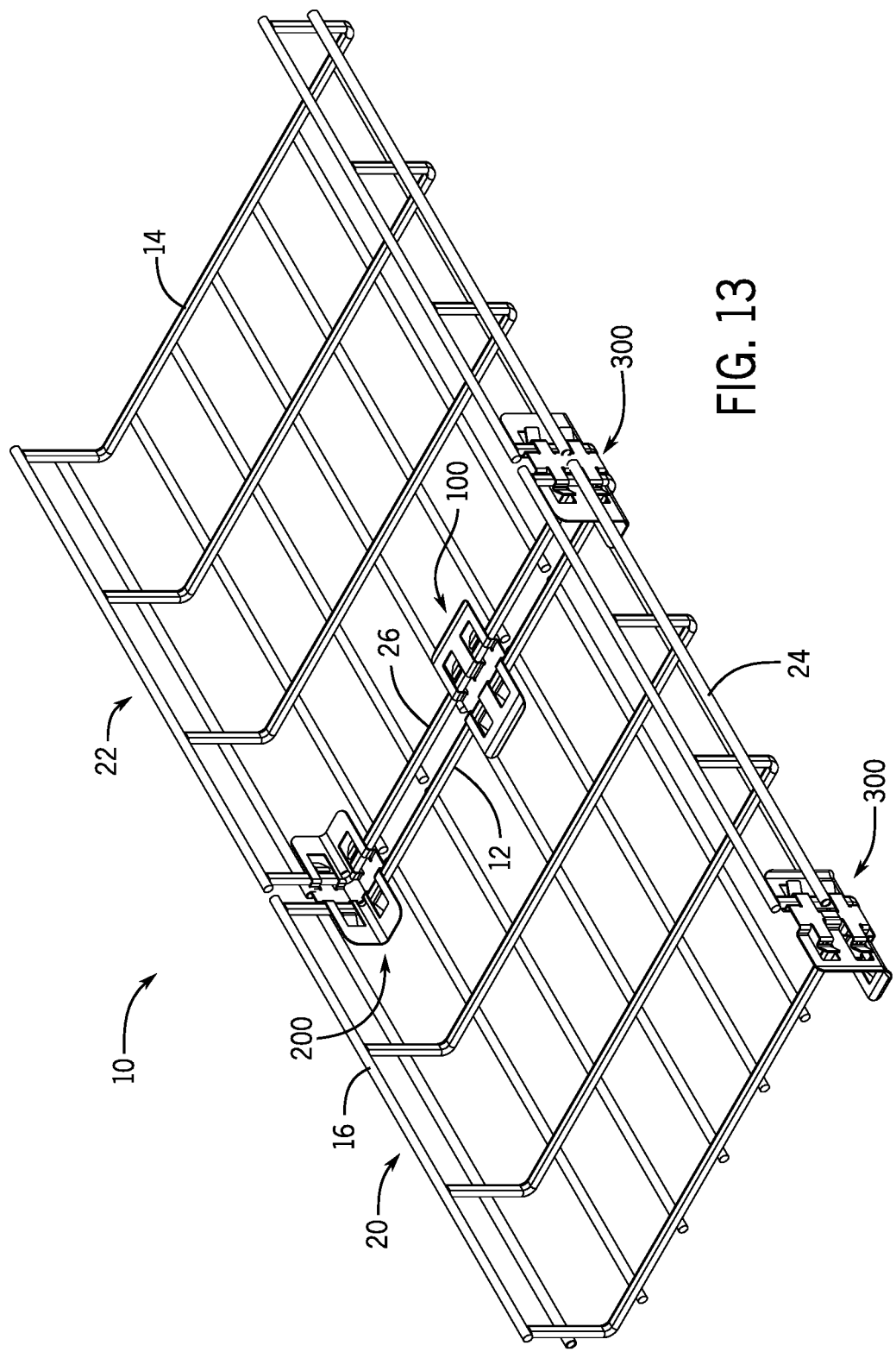
FIG. 13 is a top front isometric view of a cable tray with attached embodiments of cable tray clips according to the invention.
Figure 14:
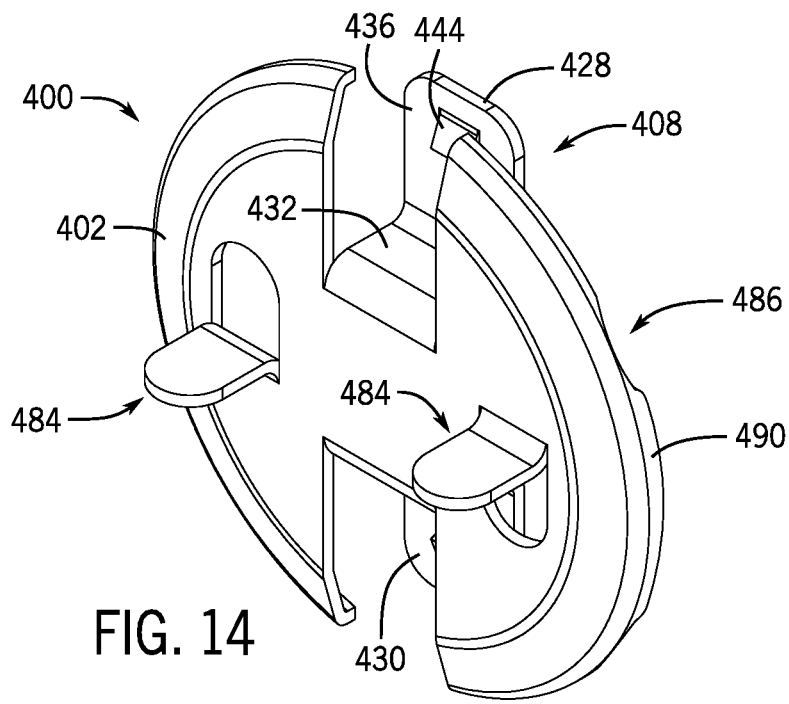
FIG. 14 is a top front isometric view of a cable tray clip according to another embodiment of the invention.
Figure 15:
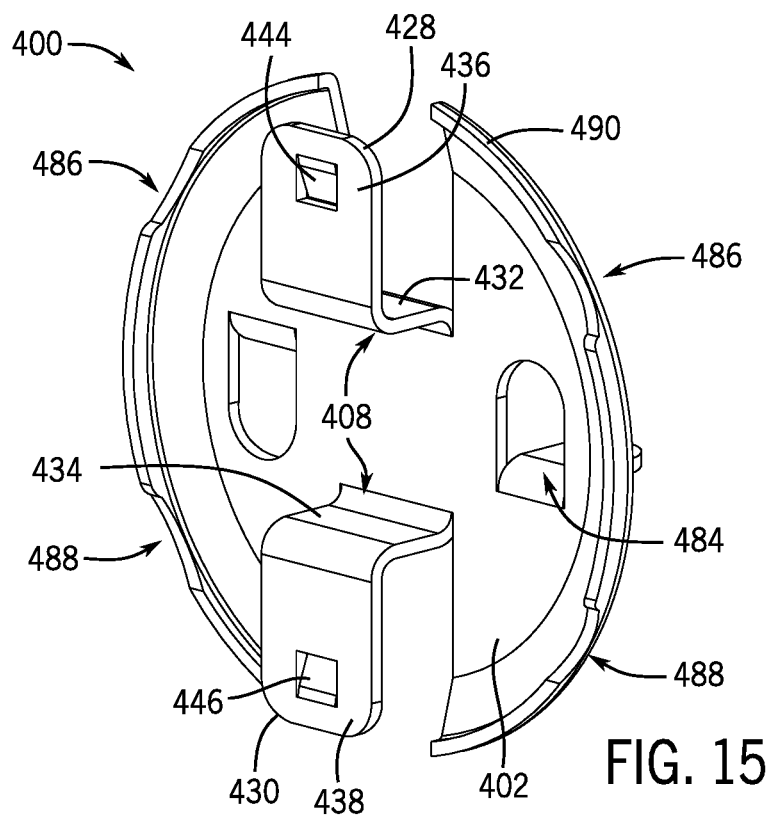
FIG. 15 is a top rear isometric view of the cable tray clip of FIG. 14.
Figure 16:
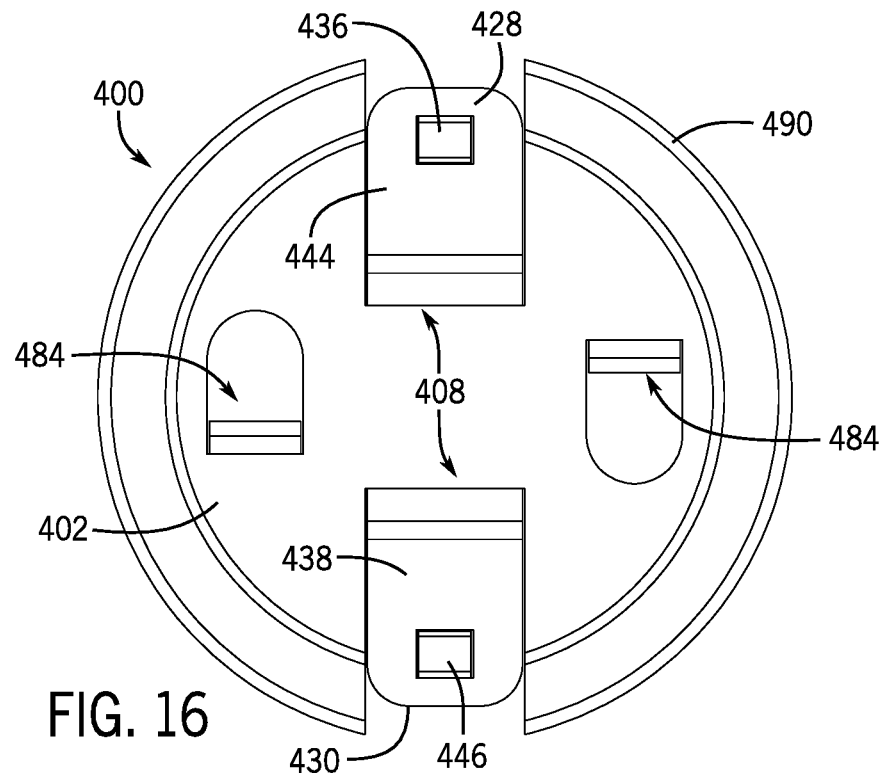
FIG. 16 is a front elevation view of the cable tray clip of FIG. 14.

In particular, in the illustrated embodiment, the low profile of the cable tray clip 100 is provided by arranging the first and second sets of tabs 108, 110 all to one side of the base plane 104, with the base 102 being the only portion of the cable tray clip 100 that extends into the area of the cable tray 10 in which cables are placed. Further, the base 10 has distal ends 176, 178 that are flared in the direction of the deck plane 118. As shown in FIG. 13, the flared distal ends 176, 178 extend downward and within the wire mesh of the cable tray 10 when the cable tray clip 100 is installed. Therefore, the distal ends 176, 178 remain out of the path of the cables installed within the cable tray 10 and do not create a cable snag point.

FIGS. 5 through 8 illustrate another embodiment of a cable tray clip 200 according to the invention, as also can be configured to be secured to and between discrete cable tray sections to provide a mechanical connection and an electrical bond there between. In many aspects, the cable tray clip 200 is similar to the cable tray clip 100 described above and similar numbering in the 200 series is used for the cable tray clip 200. For example, the cable tray clip 200 has a base 202, a bridge 206, a first set of tabs 208, and a second set of tabs 210.

In some aspects, however, the cable tray clips 100, 200 differ from each other. For example, the base 202 has a L-shape profile wherein the first set of tabs 208 are located on a first section 202*a* of the base 202 extending along a first base plane 204 and the second set of tabs 210 are located on a second section 202*b* of the base 202 extending a long a second base plane 280, the first base plane 204 being perpendicular to the second base plane 280.

Correspondingly, the cable tray clip 200 is configured to join discrete sections 20, 22 of the cable tray 10 in a corner of the cable tray 10 along the bottom 14 and side 16 thereof (shown in FIG. 13). In this regard, the location and structural configuration of the connection of the cable tray clip 200 (including as discussed in part relative to the clip 100) allows for transfer of tension, compression, and shear loads from the first discrete section 20 to the second discrete section 22. Connecting the clip 200 at a corner of the tray 10 also allows the clip 220 to directly engage lateral wires 12, 26 that lie within two planes of the cable tray cross section. The lateral wires 12, 26 can thereby be aligned in two directions. This can be advantageous during the construction of the cable tray 10, because it is not uncommon for a contractor to assemble several discrete sections of tray together prior to lifting the assembled cable tray into place. During the lifting process, portions of the cable tray can be cantilevered or simply supported, creating bending moments around the splice. The cable tray clip 200 can provide substantial support to the joint between the first discrete section 20 and the second discrete section 22 in this regard.

FIGS. 9 through 12 illustrate another embodiment of a cable tray clip 300 according to the invention, as also can be configured to be secured to and between discrete cable tray sections to provide a mechanical connection and an electrical bond there between. In many aspects, the cable tray clip 300 is similar to the cable tray clip 200 described above and similar numbering in the 300 series is used for the cable tray clip 300. For example, the cable tray clip 300 has a base 302, a bridge 306, a first set of tabs 308, and a second set of tabs 310. Further, the base 302 of the cable tray clip 300 has a L-shape profile wherein the first set of tabs 308 are located on a first section 302*a* of the base 302 extending along a first base plane 304 and the second set of tabs 310 are located on a second section 302*b* of the base 302 extending a long a second base plane 380, the first base plane 304 being perpendicular to the second base plane 380.

In some aspects, however, the cable tray clips 200, 300 differ from each other. For example, a third set of tabs 382 spaced from the second set of tabs 310 on the second section 302*b* of the base 302. The third set of tabs 382 is substantially 110 is substantially similar in configuration to the first set of tabs 308 and the second set of tabs 310 and includes a first tab 348 and a second tab 350. In this regard, for example, the cable tray clip 300 can be viewed as, effectively, a combination of the cable tray clips 100, 200, with correspondingly improved performance. Further, a variety of other configurations are also possible, including with a variety of other numbers and relative configurations of sets of tabs, bridges, bridge width(s), and other features.

FIGS. 14 through 17 illustrate another embodiment of a cable tray clip 400 according to the invention, as also can be configured to be secured to and between discrete cable tray sections to provide a mechanical connection and an electrical bond therebetween. The cable tray clip 400 has a base 402, a set of tabs 408 extending from the base 402 in a first direction, and a set of grips 484 extending from the base 402 in a second direction opposite the first direction. The base 402, the set of tabs 408, and the set of grips 484 can be integrally formed as part of a single component that can be formed from an electrically conductive and appropriately resilient material (e.g., spring steel).

The base 402 defines a base plane 404 (see FIG. 17) and has a peripheral flange 490 extending along the periphery of the base 402 and perpendicular to the base plane 404. The base 402 further has a first set of notches 486 and a second set of notches 488 provided within the peripheral flange 490. The first and second sets of notches 486, 488 can be configured, including sized and shaped, to receive lateral wires (e.g., lateral wires 12, 26 from the first and second discrete sections 20, 22 of the cable tray 10).

Continuing with the discussion of the cable tray clip 400, the set of tabs 408 includes a first tab 428 and a second tab 430, each with an engagement section 432, 434 extending from the base 402. A spine section 436, 438 extends from the engagement section 432, 434 and is spaced from and parallel with the base plane 404. The spine section 436, 438 is spaced a distance 492 from the location within the sets of notches 486, 488 that is farthest from the spine section 436, 438. The distance 492 can be configured to be approximately equal to a width or depth (or the diameter if a circular cross-section) of the lateral wire 12, 26.

Figure 17:
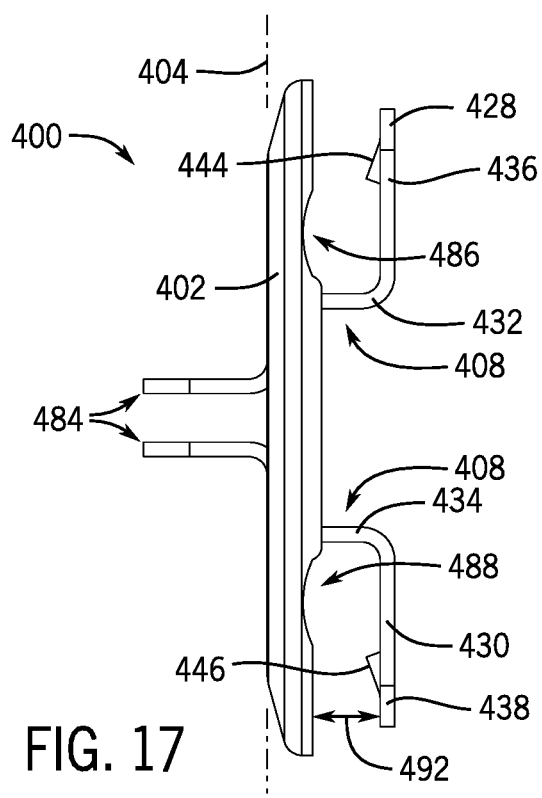
FIG. 17 is a left side elevation view of the cable tray clip of FIG. 14.

As shown in FIG. 17, the first set of notches 486 are aligned and positioned to receive a lateral wire (e.g., the lateral wire 12 from the first discrete section 20 of the cable tray 10) when the lateral wire is received by the first tab 428. Similarly, the second set of notches 486 are aligned and positioned to receive a lateral wire (e.g., the lateral wire 26 from the second discrete section 22 of the cable tray 10) when the lateral wire is received by the second tab 430. Further, the spine section 436, 438 can have a catch 444, 446 similar to the catch 144, 146 described above with respect to the cable tray clip 100.

Figure 18:
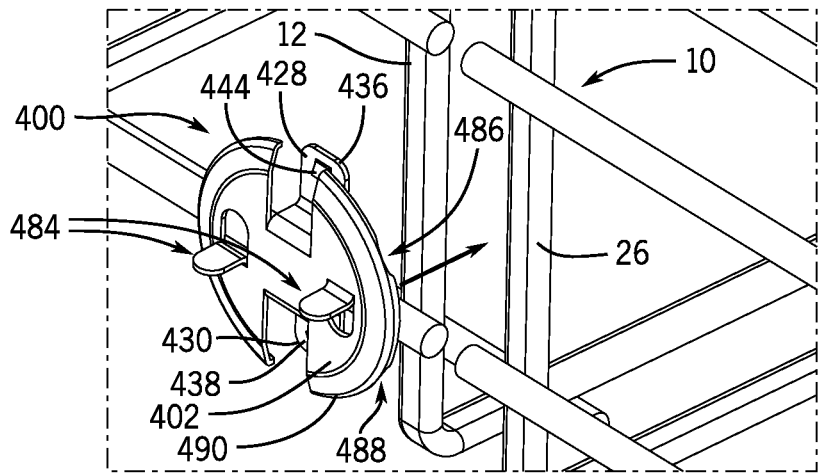
FIGS. 18-20 show the installation of the cable tray clip of FIG. 14 to a cable tray according to an embodiment of the invention.
Figure 19:
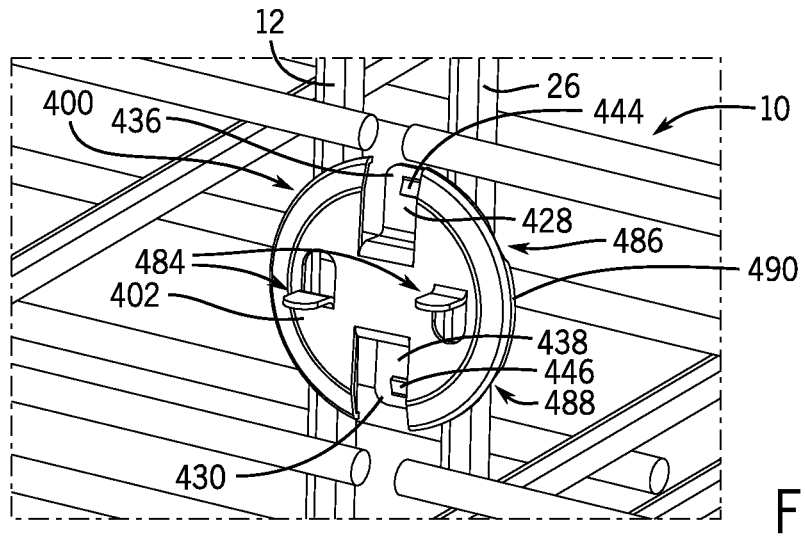
Figure 20:
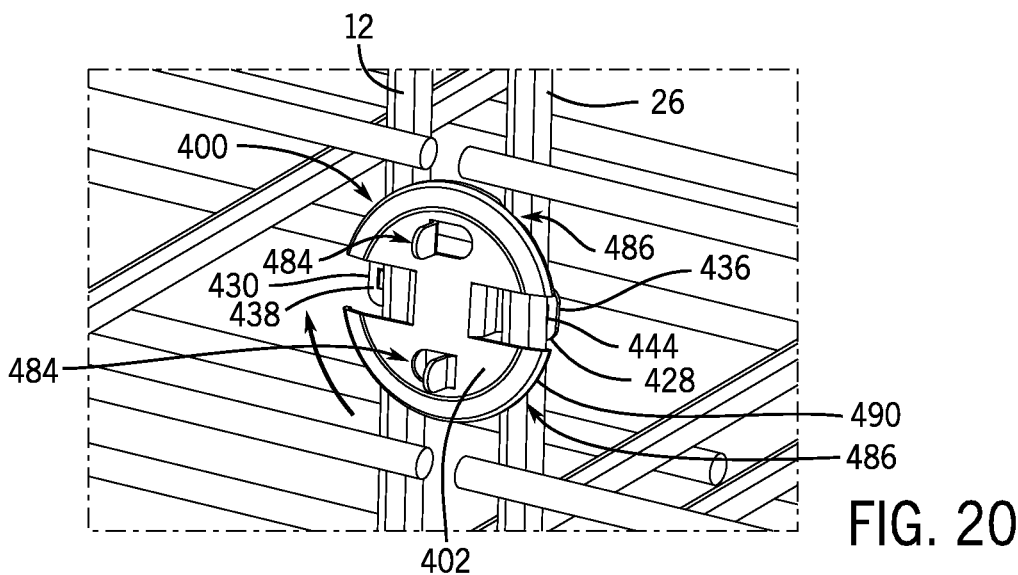
Figure 21:
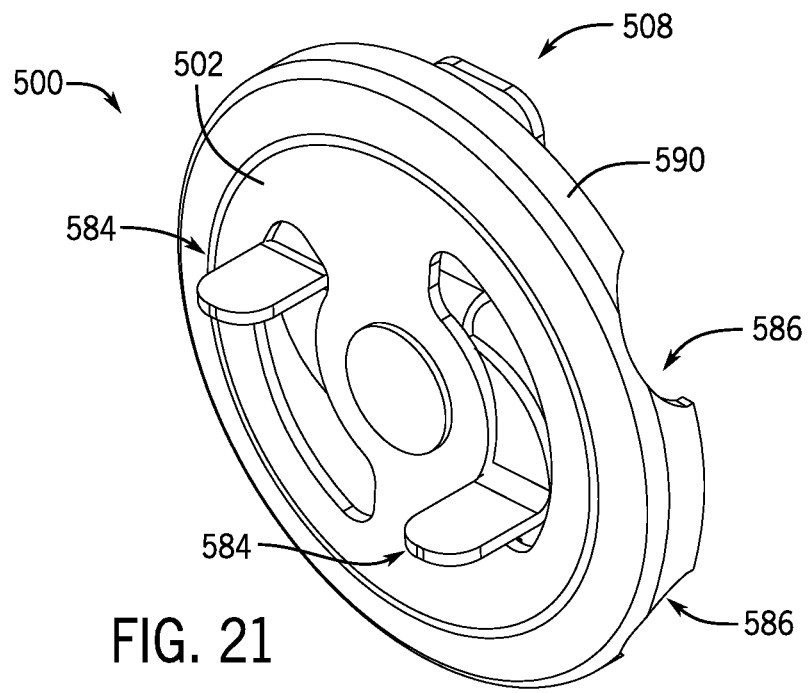
FIG. 21 is a top front isometric view of a cable tray clip according to another embodiment of the invention.
Figure 22:
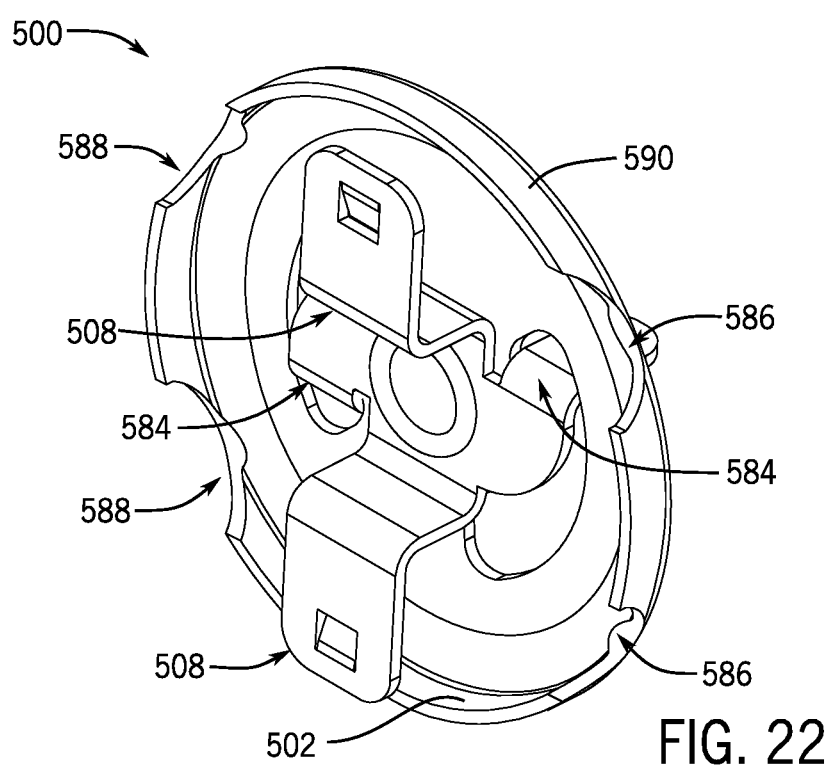
FIG. 22 is a top rear isometric view of the cable tray clip of FIG. 21.
Figure 23:
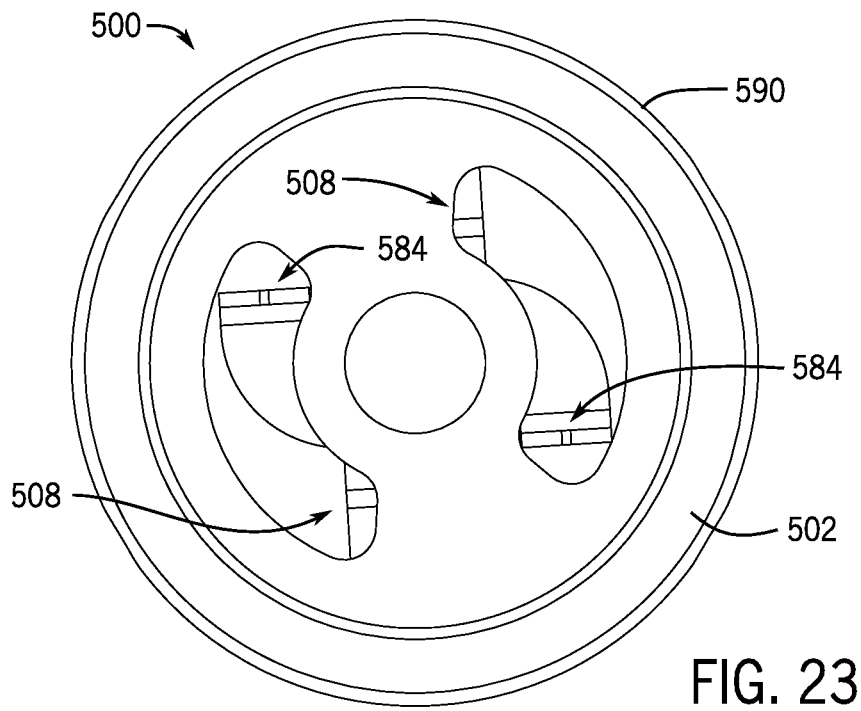
FIG. 23 is a front elevation view of the cable tray clip of FIG. 21.
Figure 24:
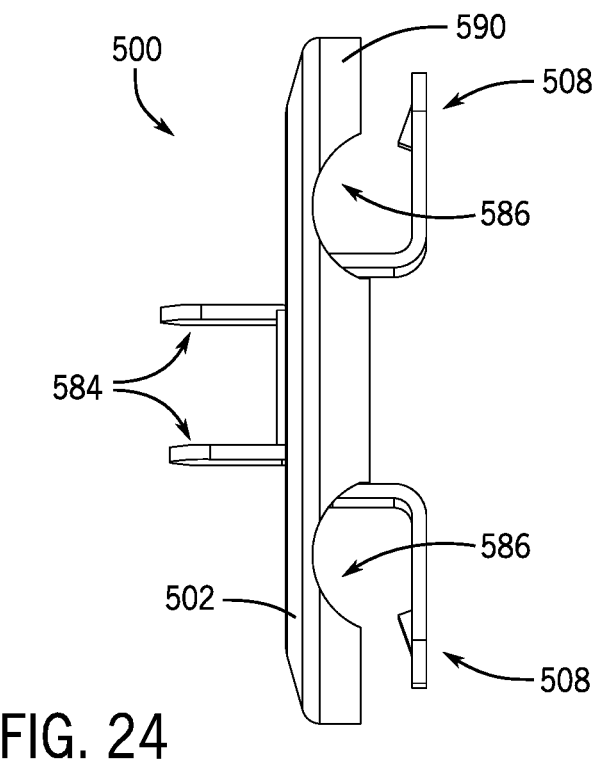
FIG. 24 is a left side elevation view of the cable tray clip of FIG. 21.

The cable tray clip 400 is configured to be twisted relative to the cable tray to mechanically secure and electrically bond two discrete sections of a cable tray. For example, looking to FIGS. 18 through 20, the first and second tabs 428, 430 are positioned in an entry position between and just beyond lateral wires 12, 26 of adjacent discrete sections of a cable tray 10. The cable tray clip 400 is then rotated either clockwise or counter-clockwise relative to the cable tray 10 and the spine sections 436, 438 engage one side of the lateral wires 12, 26 and the peripheral flange 490 engages the opposite side of the lateral wires 12, 26. It is contemplated that the spine sections 436, 438 can be flared along the edges to help the spine sections 436, 438 more easily move relative to the respective lateral wires. A rotation of the cable tray clip of about 90 degrees from the entry position aligns the first and second set of notches 486, 488 with the respective lateral wire 12, 26 and secures the lateral wires 12, 26 between the spine sections 436, 438 and the base 402 whereby the lateral wires 12, 26 are positioned within the respective first and second set of notches 486, 488. Further, the catches 444, 446 aid in preventing the lateral wires from exiting the secure connection if the cable tray experiences a tensile force at the cable tray clip 400.

In some applications, a cable tray can be modified to create a corner piece. This can be achieved by removing certain wires from the cable tray and bending the cable tray to form the corner piece. In some cases, the cable tray clip 400 can be advantageous for quickly mechanically securing and electrically bonding lateral wires of the modified cable tray to form the corner piece.

FIGS. 21 through 24 illustrate another embodiment of a cable tray clip 500 according to the invention, as also can be configured to be secured to and between discrete cable tray sections to provide a mechanical connection and an electrical bond there between. In many aspects, the cable tray clip 500 is similar to the cable tray clip 400 described above and similar numbering in the 500 series is used for the cable tray clip 500. For example, the cable tray clip 500 has a base 502, a set of tabs 508, a set of grips 584, and a first set of notches 586 and a second set of notches 588 in a peripheral flange 590 of the base 502.

In some aspects, however, the cable tray clips 400, 500 differ from each other. For example, the set of tabs 508 and the set of grips 584 are integrally formed with each other in a retainer 594 that is configured to rotate independently from and relative to the base 502 about a rivet 596, as a non-limiting example, or any feature that can couple the retainer 594 to the base 502 and allow rotation relative thereto.

Figure 25:
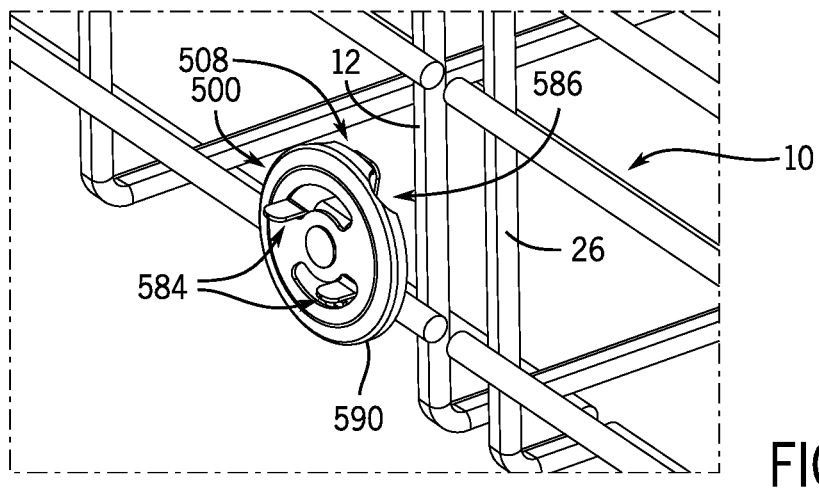
FIGS. 25-27 show the installation of the cable tray clip of FIG. 21 to a cable tray according to an embodiment of the invention.
Figure 26:
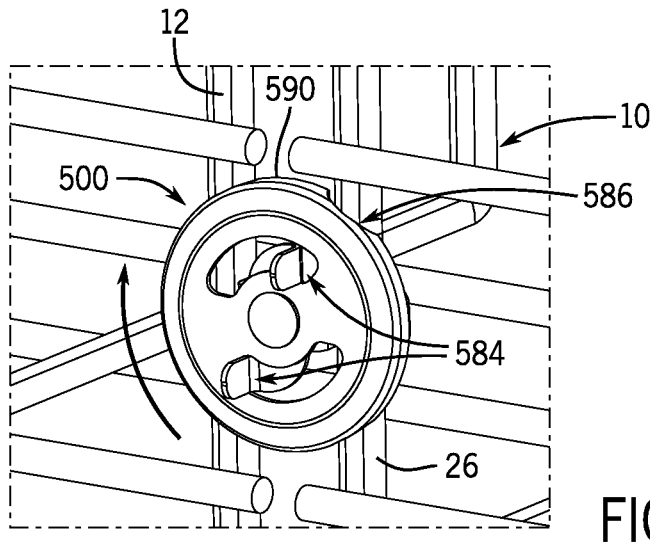
Figure 27:
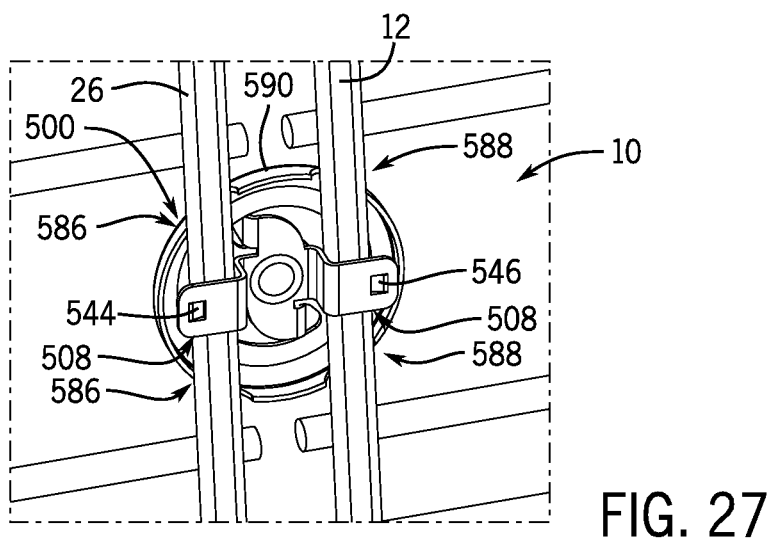

The cable tray clip 500 is configured to be installed by twisting the retainer 594 about the rivet 596 relative to the base 502 and a cable tray to mechanically secure and electrically bond two discrete sections of the cable tray. For example, looking to FIGS. 25 through 27, the retainer 594 is positioned in an open configuration with the set of tabs 508 between and just beyond lateral wires 12, 26 of adjacent discrete sections of a cable tray 10 and the lateral wires 12, 26 received within the first and second set of notches 586, 588. The retainer 594 is then rotated clockwise relative to the cable tray 10 and the base 502 to a closed configuration in which the set of tabs 508 engage one side of the lateral wires 12, 26, thereby securing the cable tray clip 500 to the lateral wires 12, 26. It is contemplated that the set of tabs 508 can be flared along the edges to ease the movement of the sets of tabs 508 relative to the respective lateral wires. Further, the catches 544, 546 (shown in FIG. 27) on the set of tabs 58 aid in preventing the lateral wires from exiting the secure connection if the cable tray experiences a tensile force at the cable tray clip 500.

Figure 28:
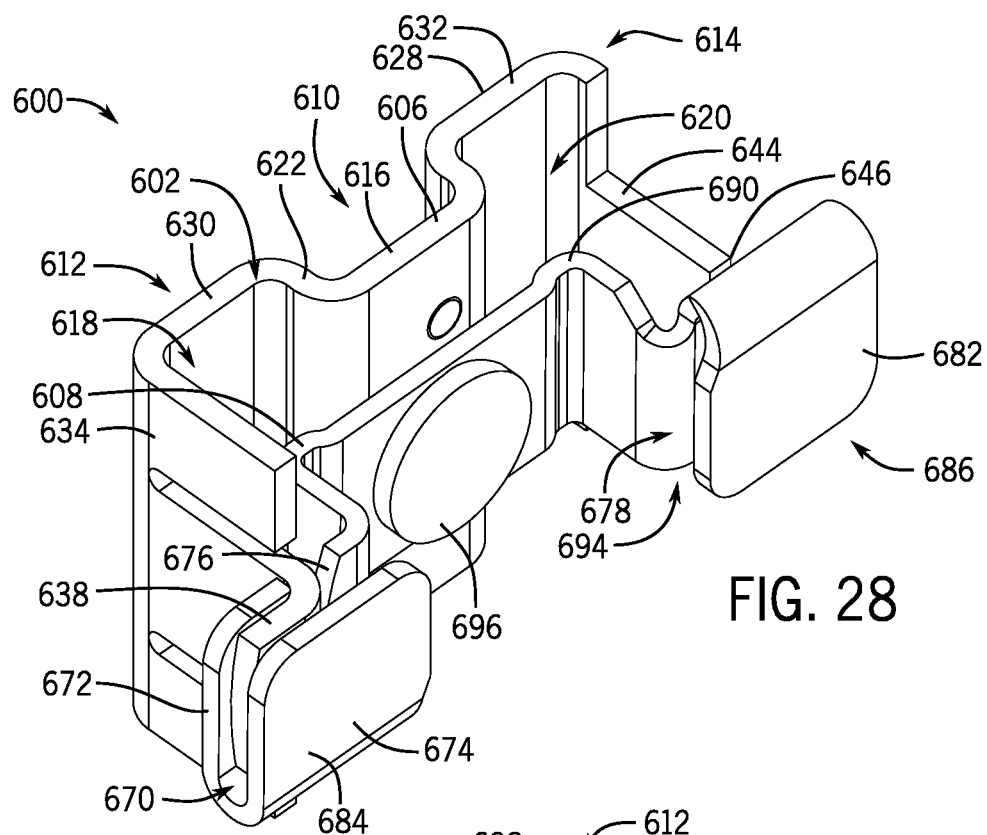
FIG. 28 is a top front isometric view of a cable tray clip according to another embodiment of the invention.
Figure 29:
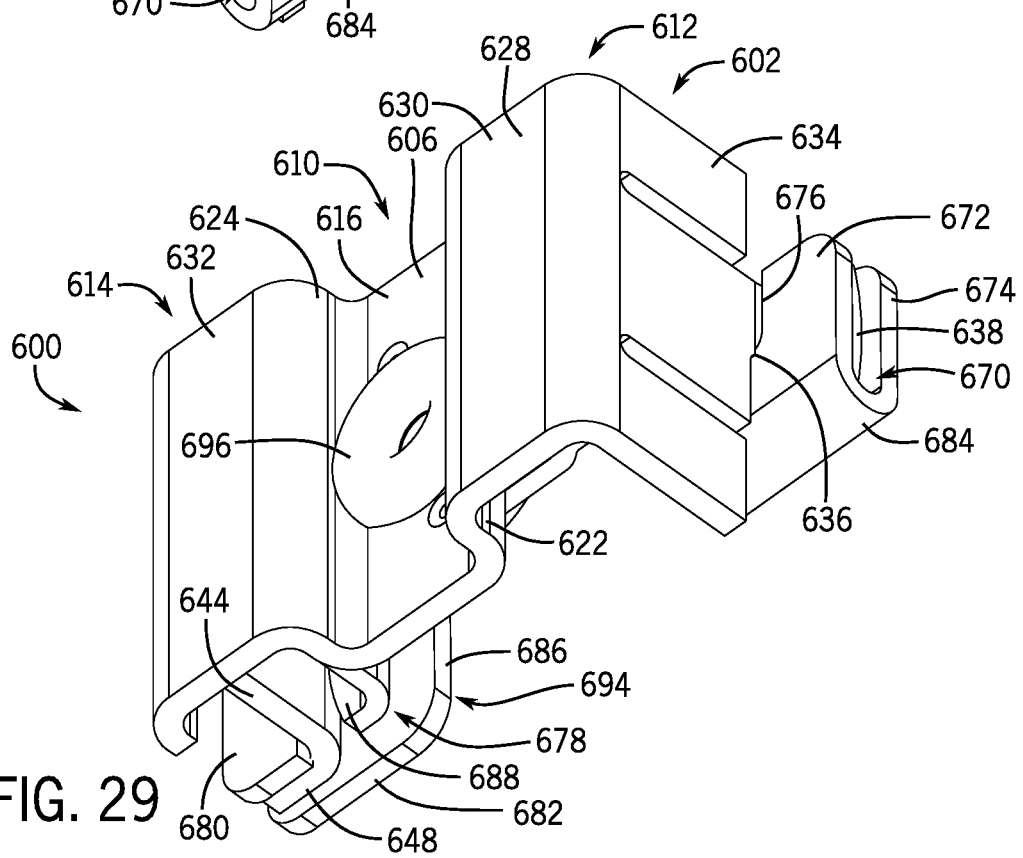
FIG. 29 is a rear bottom isometric view of the cable tray clip of FIG. 28.
Figure 30:
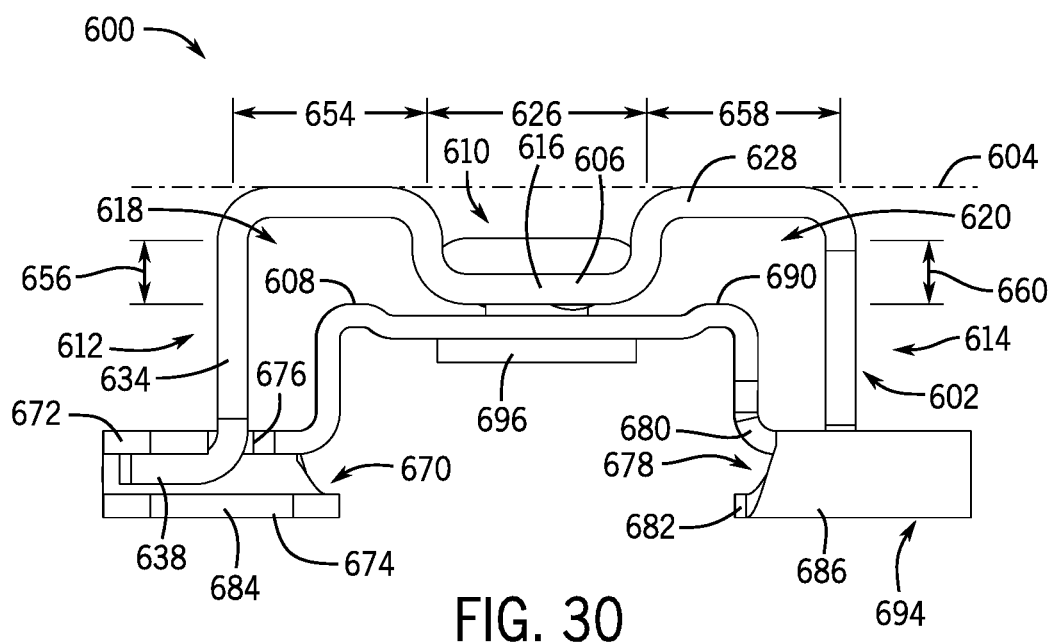
FIG. 30 is a top plan view of the cable tray clip of FIG. 28.

FIGS. 28 through 30 illustrate another embodiment of a cable tray clip 600 according to the invention, as also can be configured to be secured to and between discrete cable tray sections to provide a mechanical connection and an electrical bond there between. In many aspects, the cable tray clip 600 is similar to the cable tray clip 500 described above and similar numbering in the 600 series is used for the cable tray clip 600. For example, the cable tray clip 600 has a base 602 and a retainer 694. The retainer 694 has a set of tabs, including a first tab 608 and a second tab 690 and a set of grips, including a first grip 684 and a second grip 686. The retainer 694 is configured to be rotated relative to the base 602 about a rivet 696 to capture wires from adjacent discrete cable tray sections and retain the wires between the base 602 and the set of tabs 608, 690.

In some aspects, however, the cable tray clips 500, 600 differ from each other. For example, the base 602 is formed from a unitary piece of material, which, through manufacturing processes, provides a series of staggered partitions defining a first section 612, a second section 614, and a mid-section 610 between the first and second sections 612, 614. The first section 612 includes a first partition 634 with a first partition notch 636 (see FIG. 29) and a first leg 638 extending substantially perpendicularly from the distal end of the first partition 634. The mid-section 610 includes a base platform 628, defining a base plane 604, and a bridge 606. The bridge 606 extends from and divides the base platform 628 into a first base section 630, adjacent the first partition 634 of the first section 612, and a second base section 632. The bridge 606 has a U-shape profile with a deck 616 spaced from and parallel with the base plane 604. Further, a set of side walls, including a first side wall 622 and a second side wall 624 extend from and between the deck 616 and the base platform 628. The space between the first and second side walls 622, 624 defines a bridge width 626 (see FIG. 30). Additionally, the second section 614 includes a second partition 644, with a second partition notch 646 (see FIG. 28) and a second leg 648 (see FIG. 29) adjacent the second base section 632.

Figure 31:
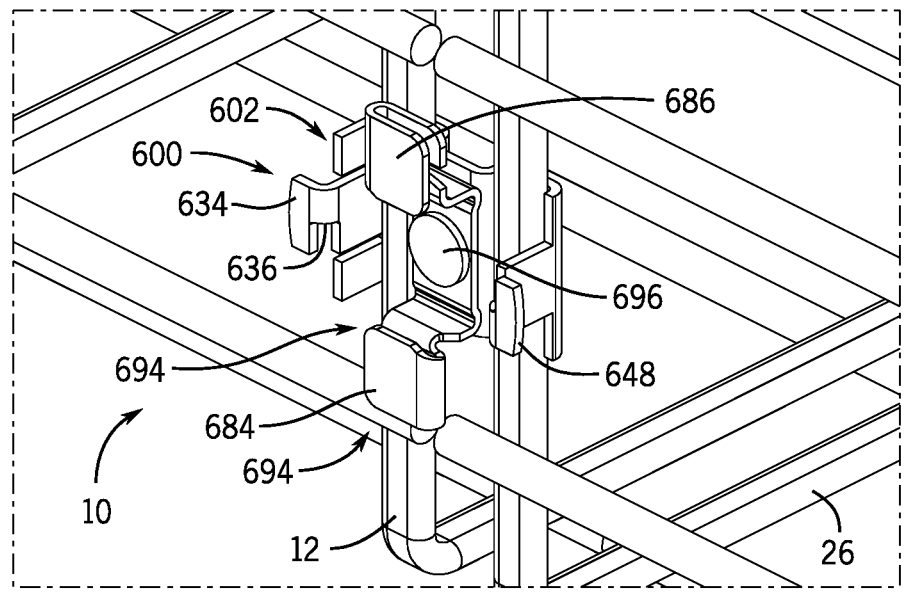
FIGS. 31 and 32 show the installation of the cable tray clip of FIG. 28 to a cable tray according to an embodiment of the invention.
Figure 32:
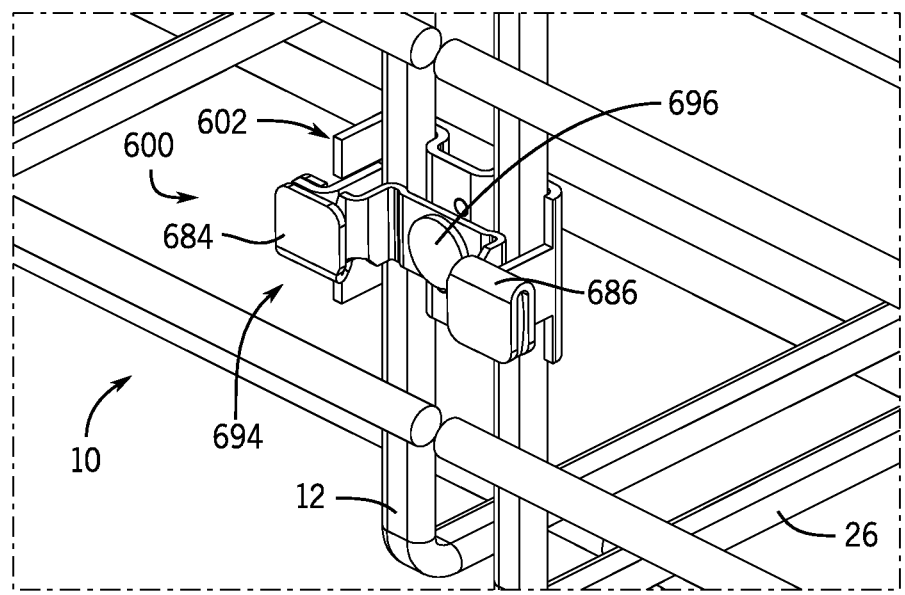

Continuing, the first partition 634, the first base section 630, and the first side wall 622 define a first pocket 618, with the distance between the first partition 634 and the first side wall 622 defining a first pocket width 654 and the distance between the deck 616 and the first base section 630 defining a first pocket depth 656. The first pocket width 654 is configured to be greater than or about equal to (including slightly less than) a width of a wire of a cable mesh tray and the first pocket depth 656 is configured to be the same or slightly less than the thickness of a wire of a cable mesh tray (for example, a first wire 12 of a cable tray 10 shown in FIGS. 31 and 32). Additionally, the second partition 644, the second base section 632, and the second side wall 624 define a second pocket 620, with the distance between the second partition 644 and the second side wall 624 defining a second pocket width 658 and the distance between the deck 616 and the second base section 632 defining a second pocket depth 660. Similarly, the second pocket width 658 is configured to be greater than or about equal to (including slightly less than) a width of a wire of a cable mesh tray and the second pocket depth 660 is configured to be the same or slightly less than the thickness of a wire of a cable mesh tray (for example, the second wire 26 of the cable tray 10 shown in FIGS. 31 and 32).

Additionally, the first and second partitions 634, 644 of the base 602 are configured to engage with the first and second grips 684, 686 of the retainer 694. The first grip 684 extends from the first tab 608 and is formed to define a first space 670 between first and second walls 672, 674. The first wall 672 has a first wall notch 676 configured to align with the first partition notch 636 and receive the first partition 634 of the base 602 therein. The second grip 686 extends from the second tab 690 in a direction opposite that of the first grip 684. The second grip 686 defines a second space 678 between third and fourth walls 680, 682. The third wall 680 has a third wall notch 688 configured to align with the second partition notch 646 and receive the second partition 644 of the base 602 therein. In other examples, including variations on the clip 600, notches may or may not be included, and a space to receive part of the base (e.g., similar to the grip 684) can alternatively (or additionally) be defined between walls of a retainer (e.g., in a mechanical inverse of the example shown in FIGS. 28 through 30).

Further, like the cable tray clip 500, the cable tray clip 600 is configured to be installed by twisting the retainer 694 about the rivet 696 relative to the base 602 and a cable tray (for example, the cable tray 10 shown in FIGS. 31 and 32) to mechanically secure and electrically bond two discrete sections of the cable tray. However, the engagement of the cable tray clip 600 to the cable tray differs. For example, looking to FIGS. 31 and 32, lateral wires 12, 26 of adjacent discrete sections of the cable tray 10 are received within the first and second pockets 618, 620, respectively, when the cable tray clip 600 is in an open configuration (shown in FIG. 31). The retainer 694 is then rotated counter-clockwise relative to the cable tray 10 and the base 602. The first and second tabs 608, 690 engage one side of the lateral wires 12, 26 and urge contact of the lateral wires 12, 26 with the first and second base sections 630, 632, respectively, thereby securing the cable tray clip 600 to the lateral wires 12, 26 when in a closed configuration (shown in FIG. 32).

Further, the first and second legs 638, 648 of the first and second partitions 634, 644 of the base 602 are received within the first and second spaces 670, 678 and engage with the first and third walls 672, 680 of the first and second grips 684, 686 of the retainer 694, respectively, when in the closed configuration. It is contemplated that one or both of the first or second legs 638, 648 can be flared along the respective distal edges to further urge contact within the inside of the first and second grips 684, 686 and urge physical engagement therewith. The engagement of the first and second legs 638, 648 within the first and second grips 684, 686 aids in maintaining the cable tray clip 600 in the closed configuration.

Figure 33:
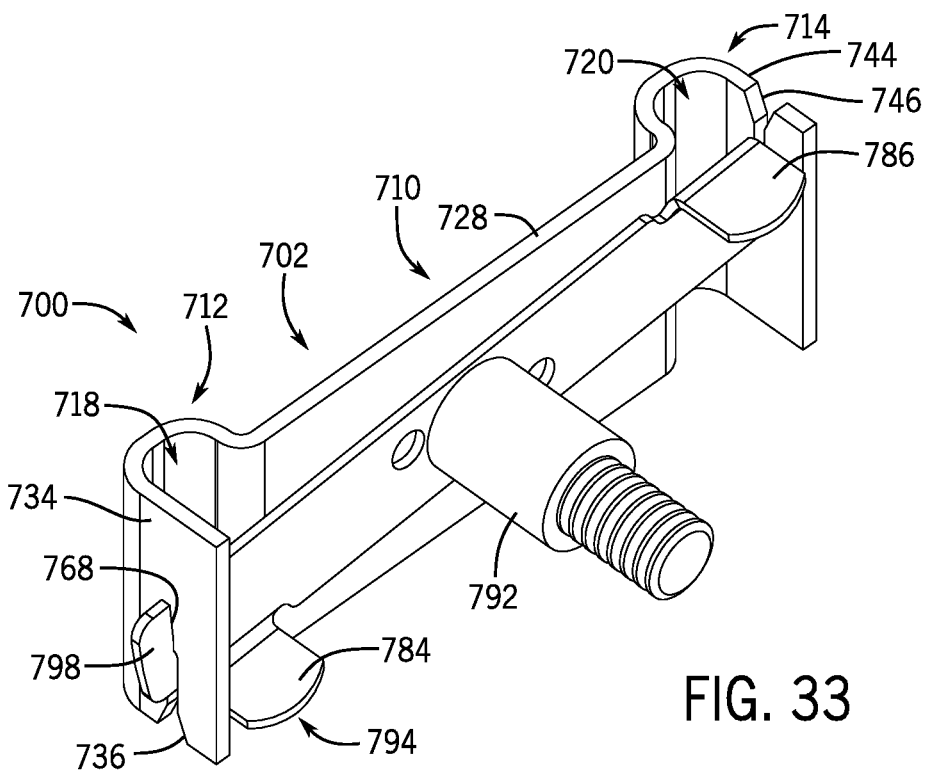
FIG. 33 is a top front isometric view of a cable tray clip according to another embodiment of the invention.
Figure 34:
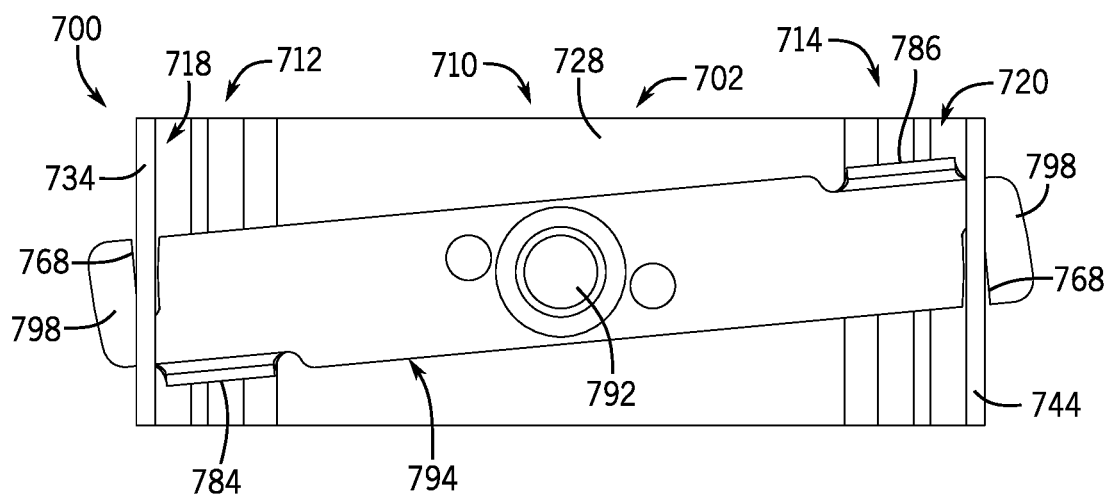
FIG. 34 is a front elevation view of the cable tray clip of FIG. 33.
Figure 35:
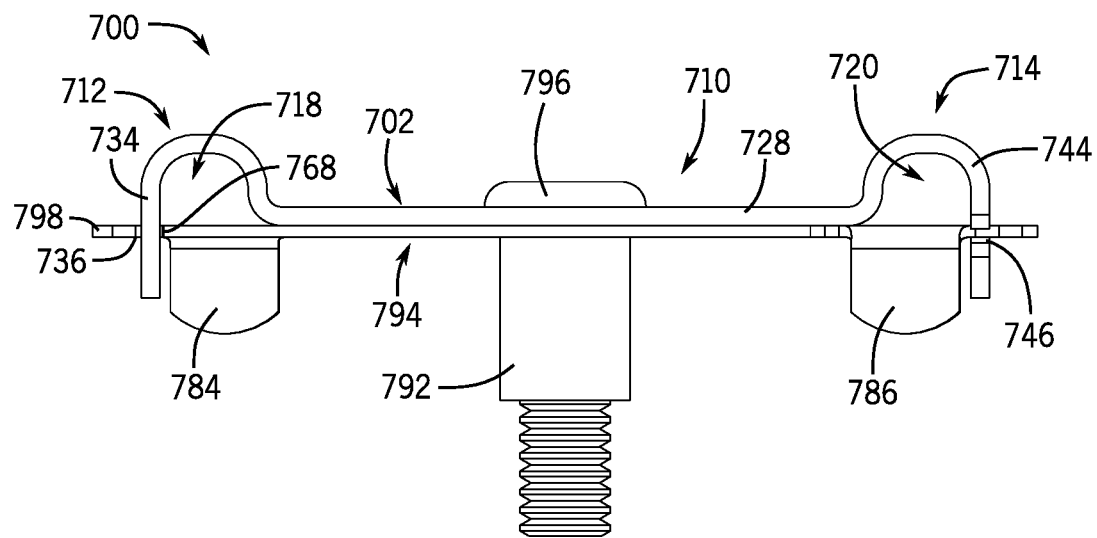
FIG. 35 is a top plan view of the cable tray clip of FIG. 33.
Figure 36:
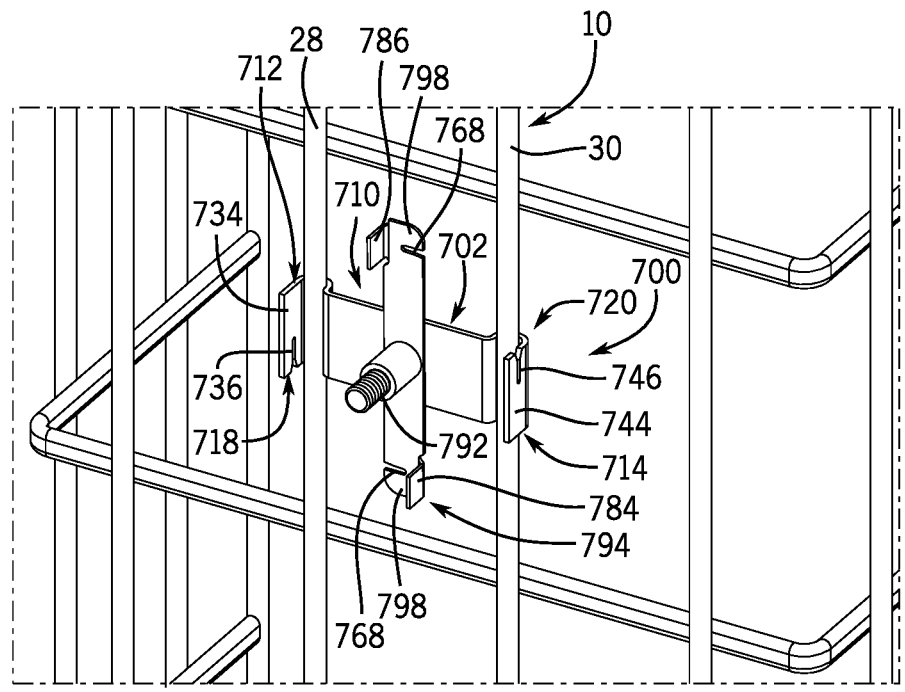
FIGS. 36 and 37 show the installation of the cable tray clip of FIG. 33 to a cable tray according to an embodiment of the invention.
Figure 37:
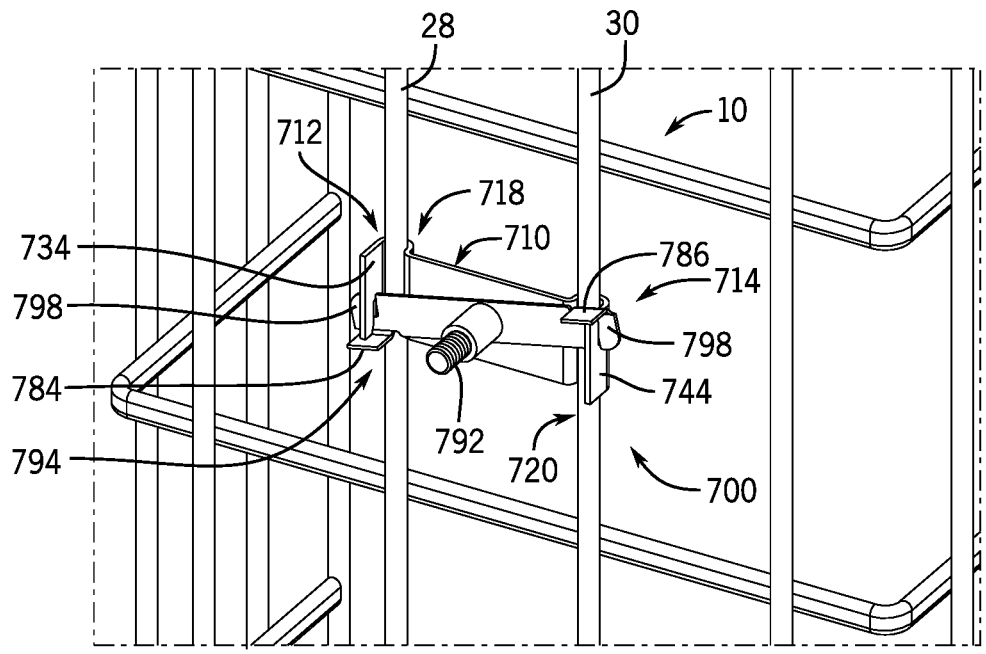

FIGS. 33 through 35 illustrate another embodiment of a cable tray clip 700 according to the invention, as also can be configured to be secured to a cable tray section. In many aspects, the cable tray clip 700 is similar to the cable tray clip 600 described above and similar numbering in the 700 series is used for the cable tray clip 700. For example, the cable tray clip 700 has a base 702 with a first section 712, a mid-section 710, and a second section 714 defining a first pocket 718 and a second pocket 720. Additionally, the cable tray clip 700 has a retainer 794 with a first grip 784 and a second grip 786, wherein the retainer 794 is configured to be rotated from an open configuration (shown in FIG. 36) relative to the base 702 about a rivet 796 to capture wires from a cable tray and retain the wires between the base 702 and the retainer 794 in a closed configuration (shown in FIG. 37).

In some aspects, however, the cable tray clips 600, 700 differ from each other. For example, first and second catches 736, 746 are formed as slots extending within first and second partitions 734, 744 of the first and second sections 712, 714, respectively. Further, the retainer 794 has a set of blades 798 extending distally outward beyond the set of grips 784. The set of blades 798 are configured to be received within the first and second catches 736, 746 to further aid in maintaining the cable tray clip 700 in the closed configuration (shown in FIG. 37). In some embodiments as shown, the blades 798 can have slots 768 alignable with the first and second catches 736, 746 and can be configured to interface therewith.

Additionally, an attachment nipple 792 extends from the retainer 794. As shown, the attachment nipple 792 extends from the middle of the retainer 794 and is in axial alignment with the rivet 796. The attachment nipple 792 can be configured to engage with a support device. For example, the attachment nipple 792 can be a threaded post, as shown, that can be received within a hole of a conduit hanger and onto which a nut can be threaded to couple the conduit hanger to the attachment nipple 792.

Figure 38:
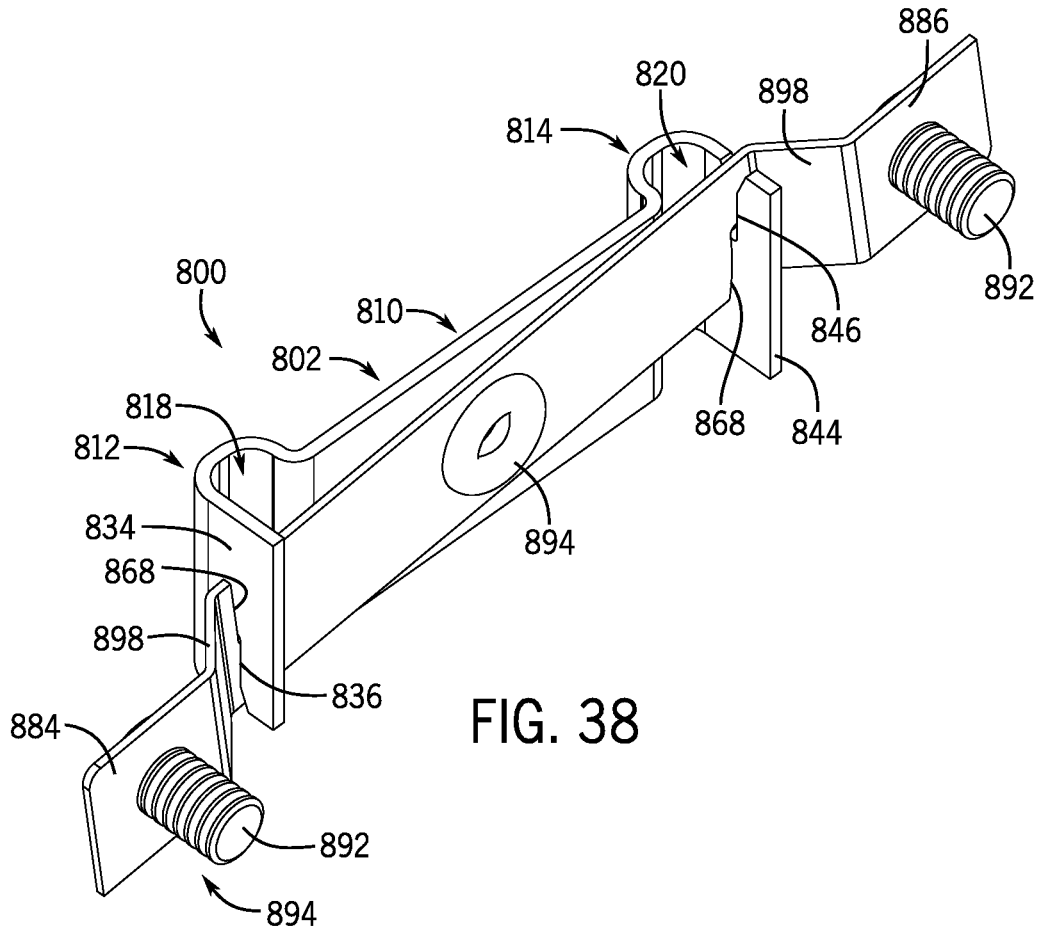
FIG. 38 is a top front isometric view of a cable tray clip according to another embodiment of the invention.
Figure 39:
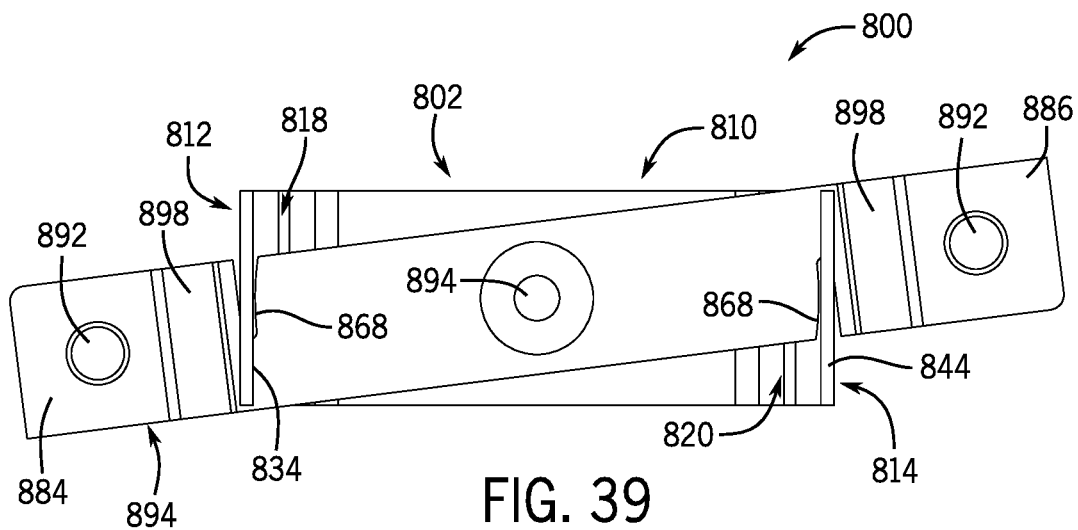
FIG. 39 is a front elevation view of the cable tray clip of FIG. 38.
Figure 40:
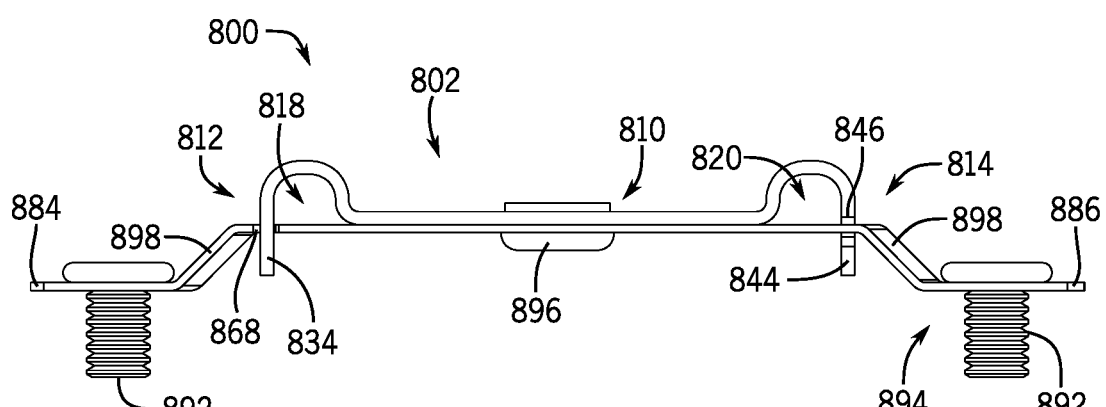
FIG. 40 is a top plan view of the cable tray clip of FIG. 38.
Figure 41:
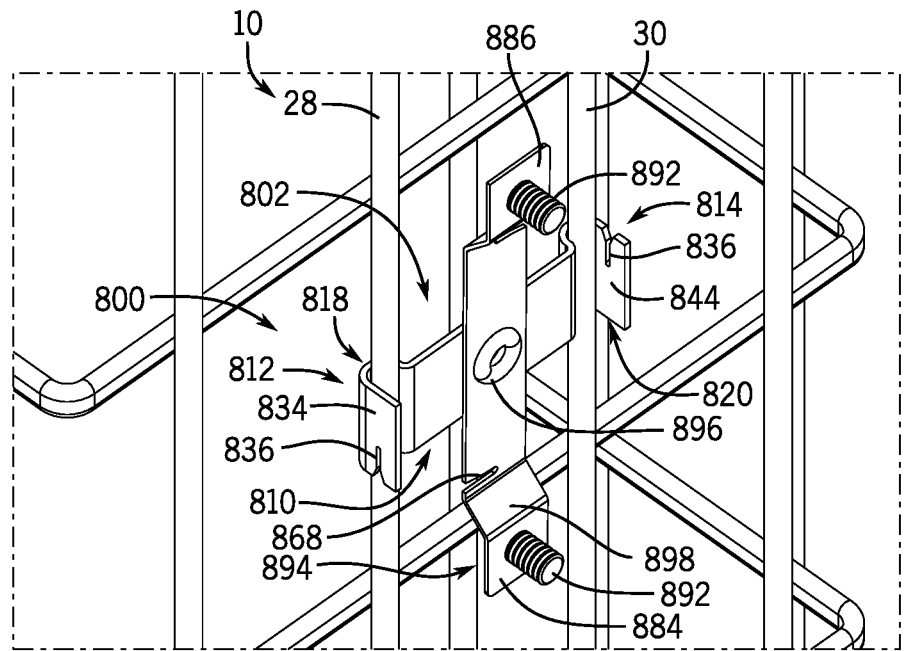
FIGS. 41 and 42 show the installation of the cable tray clip of FIG. 38 to a cable tray according to an embodiment of the invention.
Figure 42:
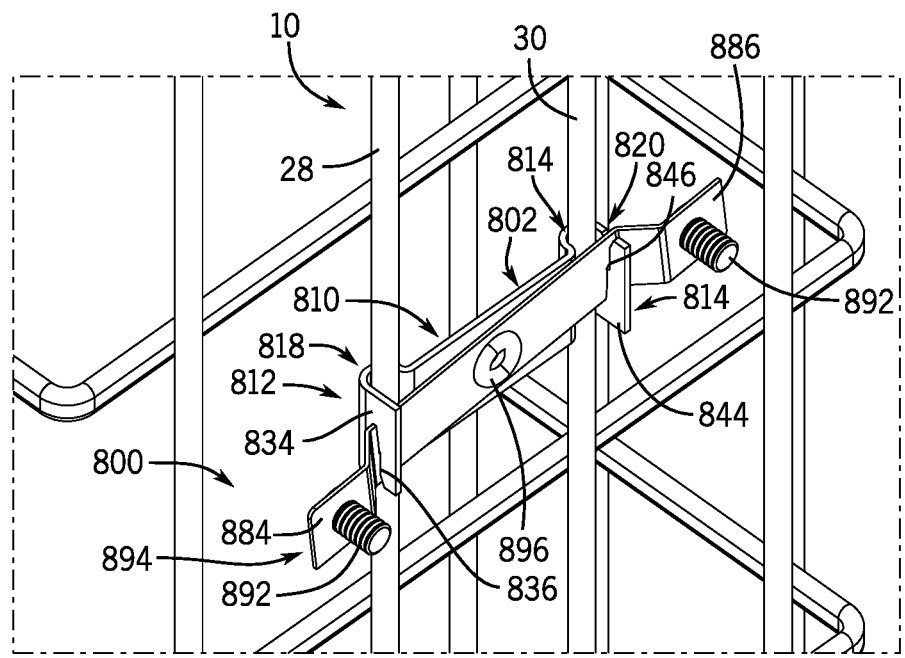

FIGS. 38 through 40 illustrate another embodiment of a cable tray clip 800 according to the invention, as also can be configured to be secured to a cable tray section. In many aspects, the cable tray clip 800 is similar to the cable tray clip 700 described above and similar numbering in the 800 series is used for the cable tray clip 800. For example, the cable tray clip 800 has a base 802 with a first section 812 with a first partition 834 and a first catch 836, a mid-section 810, and a second section 814 with a second partition 844 and a second catch 846. The cable tray clip 800 also has a first pocket 818 and a second pocket 820. Additionally, the cable tray clip 800 has a retainer 894 with set of blades 898 with slots 868 and a set of grips, including a first grip 884 and a second grip 886, wherein the retainer 894 is configured to be rotated from an open configuration (shown in FIG. 41) relative to the base 802 about a rivet 896 to capture wires from a cable tray and retain the wires between the base 802 and the retainer 894 in a closed configuration (shown in FIG. 42).

In some aspects, however, the cable tray clips 700, 800 differ from each other. For example, a set of attachment nipples 892 extend in parallel from opposing distal ends of the retainer, laterally outwardly spaced from the rivet 896 and the first and second sections 812, 814 of the base 802, differently from extending from the middle of the retainer 894.

Figure 43:
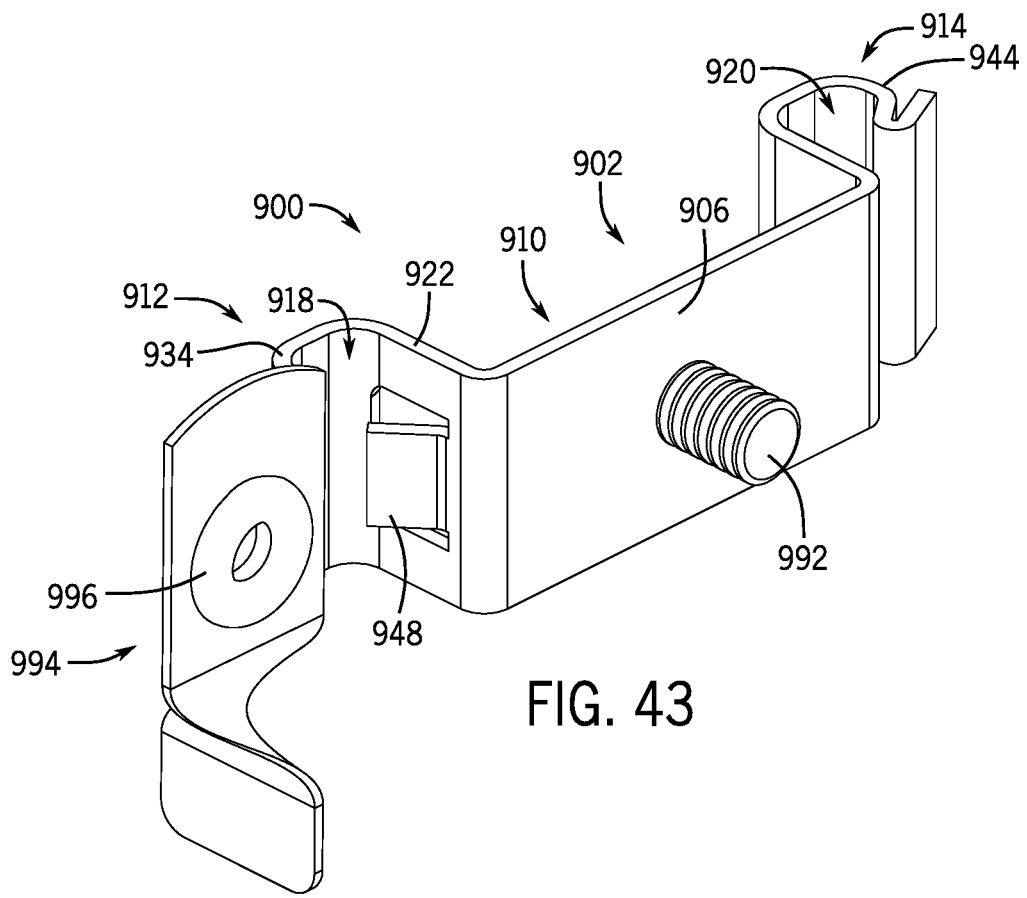
FIG. 43 is a top front isometric view of a cable tray clip according to another embodiment of the invention.
Figure 44:
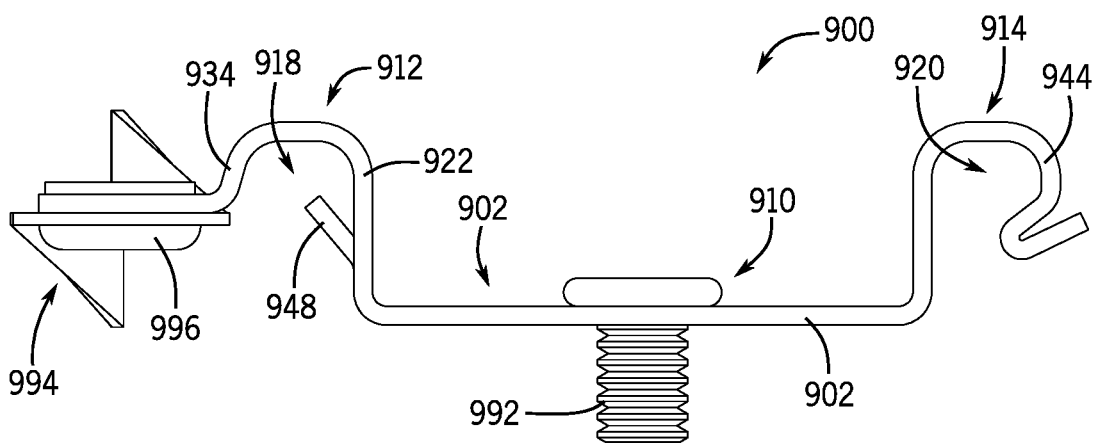
FIG. 44 is a top plan view of the cable tray clip of FIG. 43.
Figure 45:
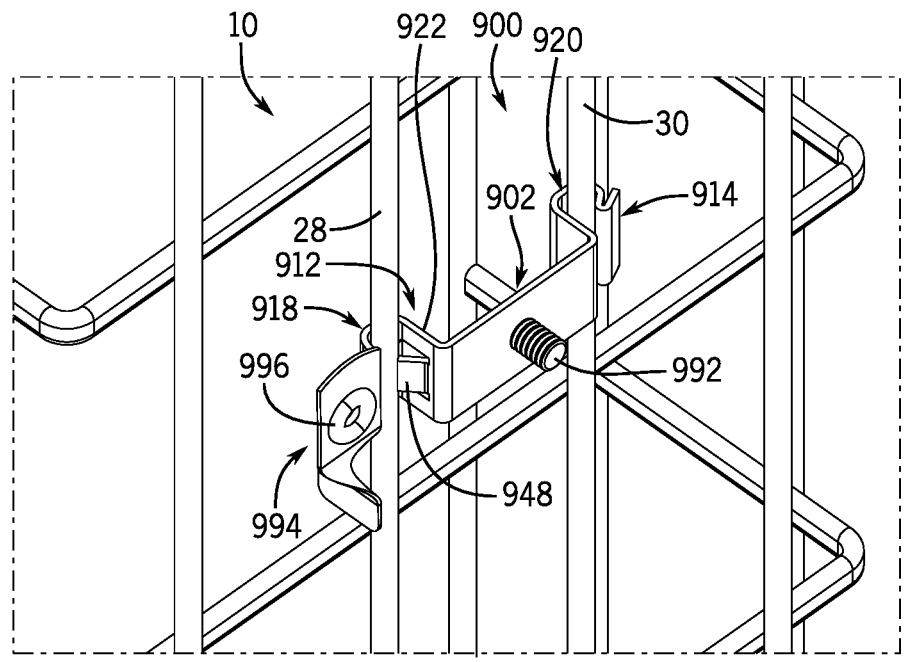
FIGS. 45 and 46 show the installation of the cable tray clip of FIG. 43 to a cable tray according to an embodiment of the invention.
Figure 46:
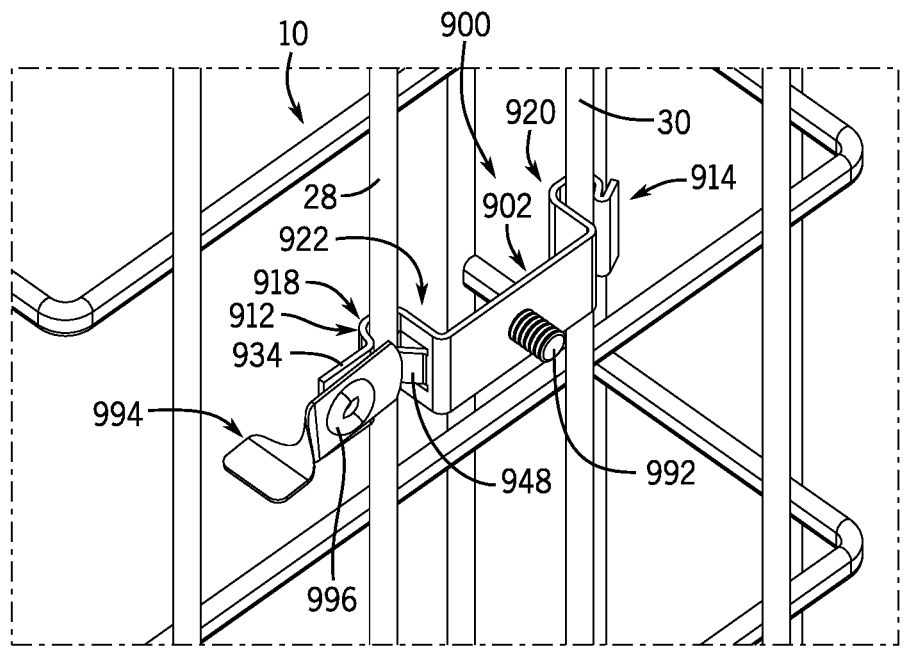

FIGS. 43 and 44 illustrate another embodiment of a cable tray clip 900 according to the invention, as also can be configured to be secured to a cable tray section. In many aspects, the cable tray clip 900 is similar to the cable tray clip 700 described above and similar numbering in the 900 series is used for the cable tray clip 900. For example, the cable tray clip 900 has a base 902 with a first section 912, a mid-section 910, and a second section 914 defining a first pocket 918 and a second pocket 920. Additionally, the cable tray clip 900 has a retainer 994, wherein the retainer 994 is configured to be rotated from an open configuration (shown in FIG. 45) relative to the base 902 about a rivet 996 to capture a wire 28 from a cable tray 10 and retain the wire 28 between the base 902 and the retainer 994 in a closed configuration (shown in FIG. 46).

In some aspects, however, the cable tray clips 700, 900 differ from each other. For example, the retainer 994 is rotatably coupled to one of the first or second partitions 934, 944 of the base 902. As shown, the retainer 994 is coupled to the first partition 934. Additionally, as shown, a catch 968 extends into the first pocket 918 from a first side wall 922 of a bridge 906 in the mid-section 910. Whereby, when the cable tray clip 900 is in the closed configuration (shown in FIG. 46), the retainer 994 engages with the catch 968 to retain the wire 28 within the first pocket 918. Further, the cable tray clip 900 has an attachment nipple 992 extending from the center of the bridge 906 in the mid-section 910 of the base 902.

Figure 47:
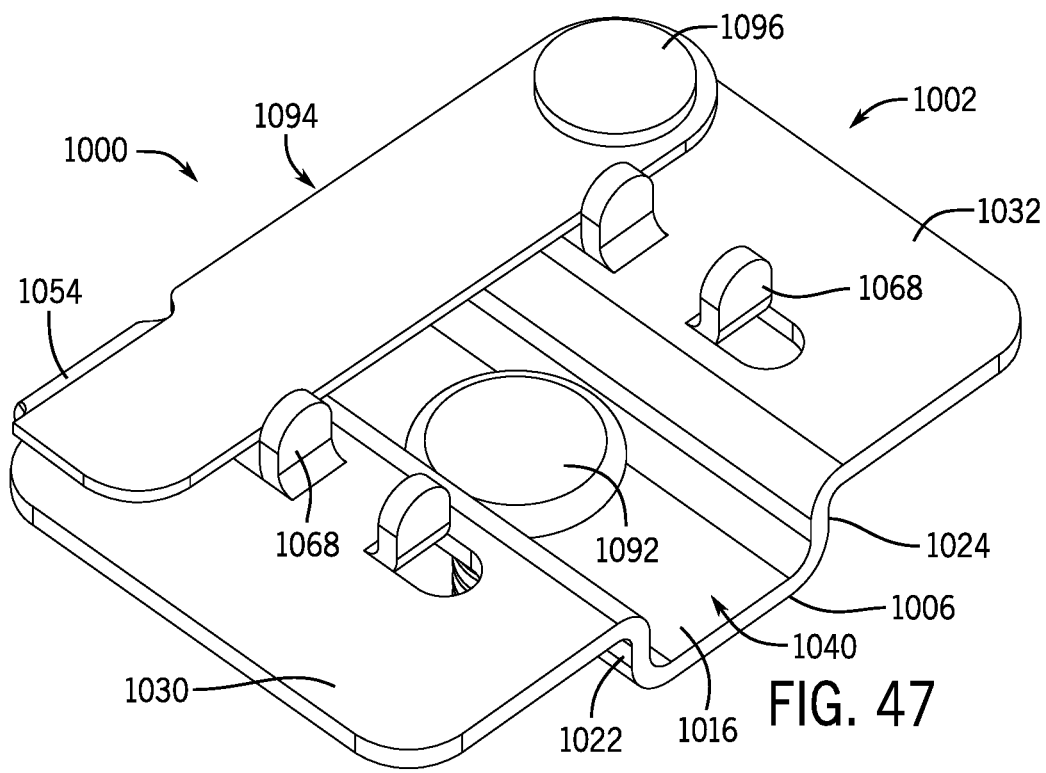
FIG. 47 is a top front isometric view of a cable tray clip according to another embodiment of the invention.
Figure 48:
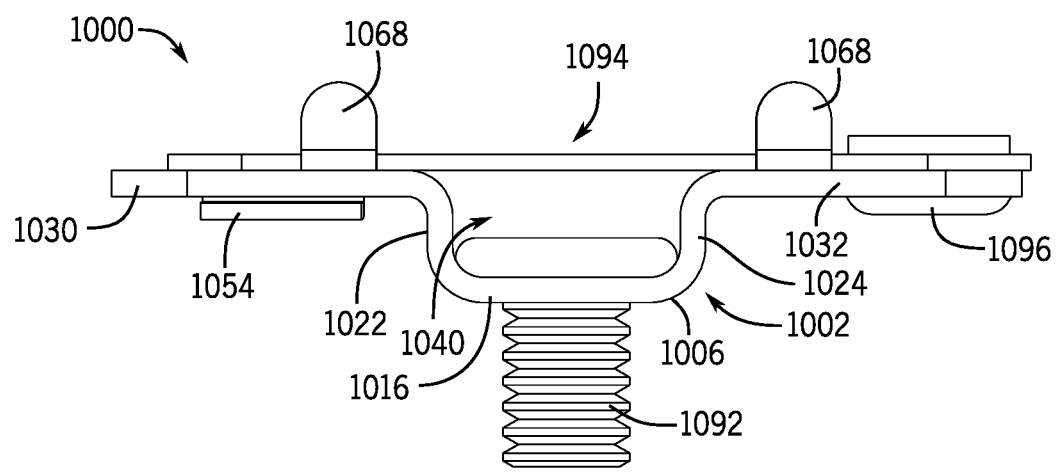
FIG. 48 is a front elevation view of the cable tray clip of FIG. 47.
Figure 49:
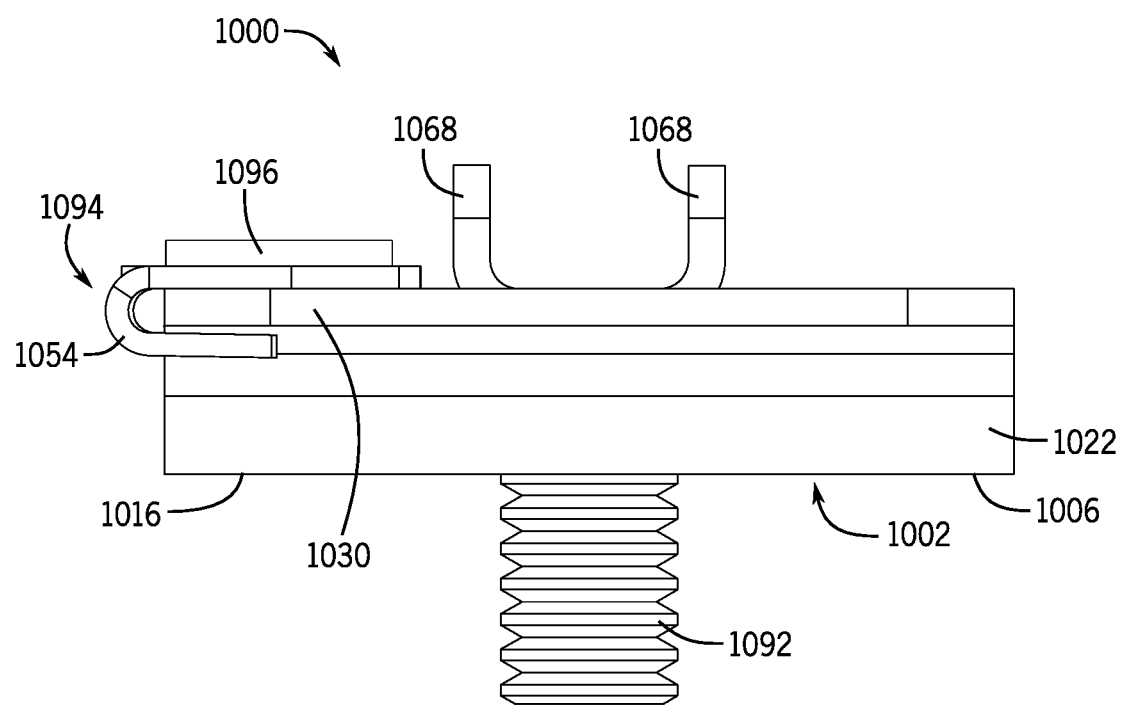
FIG. 49 is a left side elevation view of the cable tray clip of FIG. 47.

FIGS. 47 through 49 illustrate another embodiment of a cable tray clip 1000 according to the invention, as also can be configured to be secured to a cable tray section. In many aspects, the cable tray clip 1000 is similar to the cable tray clip 900 described above and similar numbering in the 1000 series is used for the cable tray clip 1000. For example, the cable tray clip 1000 has a base 1002 with a bridge 1006, a first base section 1030, and a second base section 1032. Further, the bridge 1006 has a deck 1016, a first side wall 1022, and a second side wall 1024. Additionally, the cable tray clip 1000 has a retainer 1094, wherein the retainer 1094 is configured to be rotated from an open configuration (shown in FIG. 50) relative to the base 1002 about a rivet 1096 to capture a wire 28 from a cable tray 10 and retain the wire 28 between the base 1002 and the retainer 1094 in a closed configuration (shown in FIG. 51). Further, the cable tray clip 1000 has an attachment nipple 1092 extending from the center of the bridge 1006 in the mid-section 1010 of the base 1002.

Figure 50:
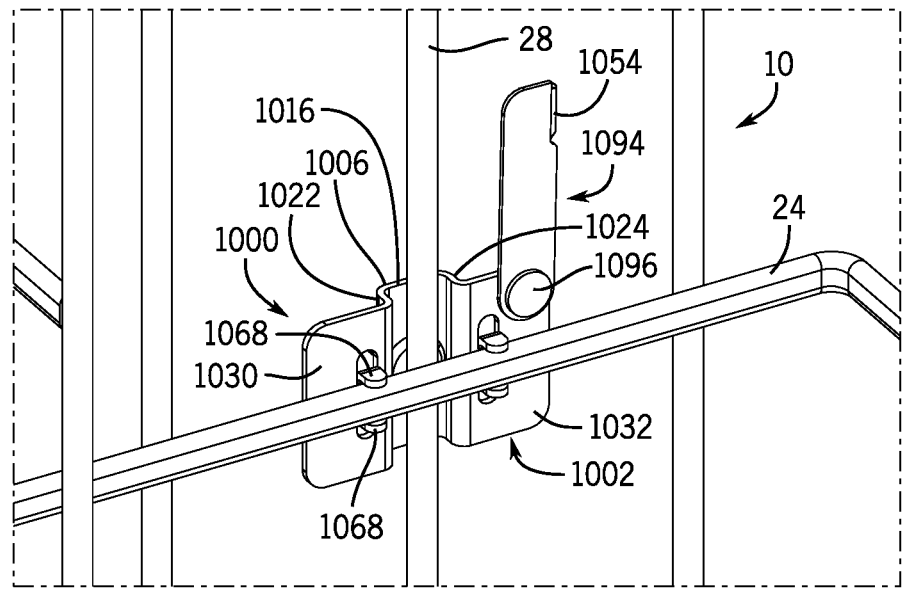
FIGS. 50 and 51 show the installation of the cable tray clip of FIG. 47 according to another embodiment of the invention.
Figure 51:
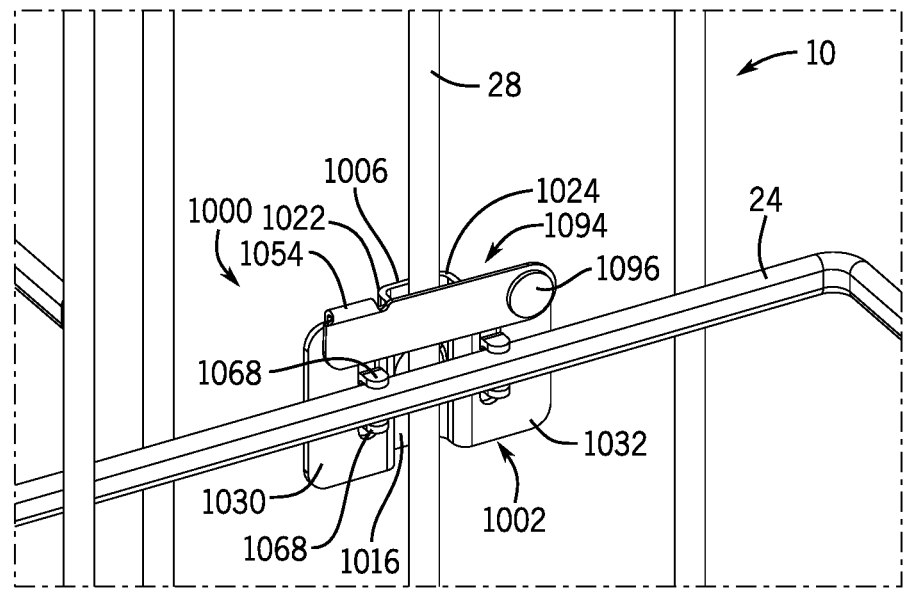

In some aspects, however, the cable tray clips 900, 1000 differ from each other. For example, although the retainer 1094 is rotatably coupled to one of the first or second base sections 1030, 1032 of the base 1002, the retainer 1094 is moveable to selectively cover a bridge pocket 1040 formed from the first and second side walls 1022, 1024 and the deck 1016. As shown, the retainer 1094 is coupled to the first base section 1030. Additionally, as shown, a plurality of projections 1068 extend from the first and second base sections 1030, 1032. As shown in FIG. 50, the projections 1068 are spaced to capture a longitudinal wire 24 of a cable tray 10 therebetween. Further, the mid-section pocket 1040 is sized to capture a bottom wire 28 that is arranged perpendicular to the longitudinal wire 24. Additionally, the retainer 1094 has a catch 1054 configured to capture a portion of the first base section 1030 therein when in the closed configuration (shown in FIG. 21). Whereby, when the cable tray clip 1000 is in the closed configuration (shown in FIG. 51), the catch 1054 of the retainer 1094 engages with the first base section 1030 to maintain the retention of the wire 28 within the mid-section pocket 1040.

Thus, embodiments of the invention provide improved securement of conduit or cables to a cable support system such as a wire basket tray or a channel support member. In some embodiments, cable tray clips according to the invention can substantially reduce the time and labor that may be required during installation and use, such as by obviating the need to install new cable support systems. Further, some embodiments of the invention can be installed before or after the conduit or cable is installed.

In other embodiments, other configurations are possible. For example, certain features and combinations of features that are presented with respect to particular embodiments in the discussion above can be utilized in other embodiments and in other combinations, as appropriate. In this regard, for example, different configurations of engagement features, attachment mechanisms, and so on, as presented with respect to a particular one of the cable tray clips 100, 200, 300, 400, 500, 600, 700, 800, 900, 1000 can be implemented in combination with features of any number of the other cable tray clips 100, 200, 300, 400, 500, 600, 700, 800, 900, 1000, or others.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

We claim:

1. A cable tray clip for attachment to a wire mesh cable tray with a first wire and a second wire, the cable tray clip comprising:
   a base with a mid-section, a set of pockets, including a first pocket defined between the mid-section and a first partition and sized to receive the first wire and a second pocket defined between the mid-section and a second partition and sized to receive the second wire; and
   a retainer rotatably coupled to the base at the mid-section, rotatable between an open configuration and a closed configuration, the retainer including a first grip and a second grip, each having a first and second wall that extend to define a space therebetween;
   wherein, with the retainer in the open configuration, the first pocket is open to receive the first wire of the wire mesh cable tray into the first pocket and the second pocket is open to receive the second wire of the wire mesh cable tray into the second pocket; and
   wherein, with the retainer in the closed configuration; the retainer closes at least one of the first or second pockets to retain, respectively, at least one of the first or second wires between the retainer and the base; and a first leg extending from the first partition is received within the space of the first grip and a second leg extending form the second partition is received within the space of the second grip, so that notches on the first and second partitions engage notches on the first walls of the first and second grips of the retainer to secure the retainer in the closed configuration.

2. The cable tray clip of claim 1, wherein the retainer further includes an attachment nipple.

3. The cable tray clip of claim 2, wherein the attachment nipple is located at the location where the retainer is rotatably coupled to the base.

4. The cable tray clip of claim 2, wherein the attachment nipple is a first nipple of a set of nipples also including a second nipple and the grip of the retainer is a first grip of a set of grips also including second grip, wherein the first and second nipples are located on the first and second grips, respectively.

5. The cable tray clip of claim 1, wherein the mid-section has a deck extending between the first and second pockets, wherein the first and second pockets have first and second base sections and a respective depth from the deck to the respective first and second base sections;
   wherein the depths of the first and second pockets are about the thickness of the wires received therein.

6. The cable tray clip of claim 1, wherein the retainer has at least one tab that is configured to extend into one of the first or second pockets to urge the at least one of the first or second wires into the respective first or second pocket when in the closed configuration.

7. The cable tray clip of claim 6, wherein, with the retainer in the closed configuration, the tab extends into the at least one of the first or second pockets.

8. A cable tray clip for attachment to a wire mesh cable tray, the cable tray clip comprising:
   a base with a mid-section, a base section, a partition with a partition notch, and a leg; and
   a retainer rotatably coupled to the base at the mid-section, the retainer having a grip with a first wall that includes a first-wall notch;
   the base and the retainer arranged such that, with the cable tray clip installed on the wire mesh cable tray, the base section is located internal to the wire mesh cable tray, the partition extends from the base section through the wire mesh cable tray, the leg extends from the partition external to the wire mesh cable tray, the first-wall notch of the retainer is engaged with the partition notch of the partition to retain the wire mesh cable tray between the base section and the retainer.

9. The cable tray clip of claim 8, wherein the base section is a first base section in a set of base sections also including a second base section, the partition is a first partition of a set of partitions also including a second partition extending from the second base section, and the grip is a first grip of a set of grips also including a second grip, the second partition having a second partition notch, and the second grip having a third wall, with a third-wall notch; and
   wherein, with the cable tray clip installed on the wire mesh cable tray, the second partition notch of the second partition engages with the third-wall notch of the second grip.

10. The cable tray clip of claim 9, wherein the first grip includes a second wall, with a first space defined between the first and second walls, the second grip has a fourth wall arranged in parallel with the third wall to define a second space therebetween and the second partition has a second leg extending therefrom; and
    wherein, with the cable tray clip installed on the wire mesh cable tray, the first and second legs of the first and second partitions are received within the first and second spaces of the first and second grips, respectively.

11. The cable tray clip of claim 9, wherein the retainer has a first tab and a second tab that, with the cable tray clip installed on the wire mesh cable tray, urge the cable tray against the first and second base sections, respectively.

12. The cable tray clip of claim 9, wherein the base further comprises a bridge extending between the first and second base sections; and
    wherein, with the cable tray clip installed on the wire mesh cable tray, the bridge extends between adjacent wires of the wire mesh cable tray.

13. The cable tray clip of claim 8, wherein the retainer further includes an attachment nipple.

14. A method for attaching a cable tray clip to a first wire and a second wire of a wire mesh cable tray, the method comprising:
    with the cable tray clip in an open configuration, moving the cable tray clip to receive the first wire within a first pocket of a base of the cable tray clip and the second wire within a second pocket of the base and positioning a base section of the cable tray clip internal to the wire mesh cable tray, a partition of the cable tray clip extending from the base section through the wire mesh cable tray, and a leg extending from the partition external to the wire mesh cable tray; and
    rotating a retainer rotatably coupled to the base to place the cable tray clip in a closed configuration in which a first-wall notch in a first wall of a grip of the retainer is engaged with a partition notch in the partition of the base and the first and second wires are retained within the first and second pockets and between the retainer and the base.

15. The method of claim 14, wherein the first wire is a wire of a first discrete cable tray section and the second wire is a wire of a second discrete cable tray section.

16. The method of claim 15, wherein the first and second wires are located along respective sides of the first and second discrete cable tray sections.

17. The method of claim 14, wherein the first wire and the second wire are wires extending along a bottom of a discrete cable tray section.

18. The method of claim 14, wherein the retainer has tabs that contact the first and second wires when in the closed configuration and urge the first and second wires into contact with the base; wherein the contact provides a mechanical securing connection and an electrically bonding connection between the first and second wires, the base, and the retainer.

\* \* \* \* \*